United States Patent
Kim et al.

(10) Patent No.: US 11,281,359 B2
(45) Date of Patent: Mar. 22, 2022

(54) MOBILE TERMINAL AND CONTROL METHOD THEREOF

(71) Applicant: LG ELECTRONICS INC., Seoul (KR)

(72) Inventors: Eunhye Kim, Seoul (KR); Taeyoung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 16/323,182

(22) PCT Filed: Nov. 10, 2016

(86) PCT No.: PCT/KR2016/012924
§ 371 (c)(1),
(2) Date: Feb. 4, 2019

(87) PCT Pub. No.: WO2018/026059
PCT Pub. Date: Feb. 8, 2018

(65) Prior Publication Data
US 2019/0179500 A1    Jun. 13, 2019

(30) Foreign Application Priority Data

Aug. 5, 2016  (KR) .................. 10-2016-0100158

(51) Int. Cl.
*G06F 3/0483*      (2013.01)
*G06F 3/0488*      (2013.01)
(Continued)

(52) U.S. Cl.
CPC ............ *G06F 3/0483* (2013.01); *G06F 3/048* (2013.01); *G06F 3/0481* (2013.01);
(Continued)

(58) Field of Classification Search
CPC ...... G06F 3/0483; G06F 3/048; G06F 3/0481; G06F 3/0488; G06F 3/04886; H04M 1/72586; H04M 1/72569; H04M 2250/22
(Continued)

(56) References Cited

U.S. PATENT DOCUMENTS 10,261,672 B1 *   4/2019  Dolbakian .......... G06F 3/04817
2013/0076659 A1   3/2013  Miyaji
(Continued)

FOREIGN PATENT DOCUMENTS

KR   10-2013-0005174 A   1/2013
KR   10-2013-0050871 A   5/2013
(Continued)

OTHER PUBLICATIONS

International Search Report for PCT/KR2016/012924 (PCT/ISA/210) dated Apr. 27, 2017.

*Primary Examiner* — Tadesse Hailu
*Assistant Examiner* — Darrin Hope
(74) *Attorney, Agent, or Firm* — Birch, Stewart, Kolasch & Birch, LLP

(57) ABSTRACT

The present invention relates to a mobile terminal which provides an application more intuitively and a control method thereof and, more particularly, to a mobile terminal and a control method thereof, comprising: a display unit for displaying a specific home screen page from among a plurality of home screen pages; and a control unit for executing an application corresponding to the specific icon in response to a touch input for a specific icon included in the specific home screen page, wherein the control unit generates a temporary home screen page related to the application in response to a touch input of a predetermined (Continued)

type applied during execution of the application, and the temporary home screen page includes an application related to the executing application.

17 Claims, 21 Drawing Sheets

(51) Int. Cl.
| | |
|---|---|
| *G06F 3/0481* | (2022.01) |
| *G06F 3/048* | (2013.01) |
| *H04M 1/72472* | (2021.01) |
| *G06F 3/04886* | (2022.01) |
| *H04M 1/72454* | (2021.01) |

(52) U.S. Cl.
CPC ........ *G06F 3/0488* (2013.01); *G06F 3/04886* (2013.01); *H04M 1/72472* (2021.01); *H04M 1/72454* (2021.01); *H04M 2250/22* (2013.01)

(58) Field of Classification Search
USPC .......................................................... 715/811
See application file for complete search history.

(56) References Cited

U.S. PATENT DOCUMENTS

| | | | | |
|---|---|---|---|---|
| 2014/0059426 | A1* | 2/2014 | Lee | G06F 40/106 |
| | | | | 715/273 |
| 2014/0164943 | A1* | 6/2014 | Jeon | G06F 3/04883 |
| | | | | 715/744 |
| 2015/0227308 | A1* | 8/2015 | Kim | G06F 3/0486 |
| | | | | 715/769 |
| 2015/0339036 | A1* | 11/2015 | Hwang | G06F 3/0482 |
| | | | | 715/763 |
| 2015/0350147 | A1* | 12/2015 | Shepherd | G06F 3/04842 |
| | | | | 715/752 |
| 2015/0378707 | A1* | 12/2015 | Park | G06F 3/0486 |
| | | | | 717/174 |
| 2016/0259497 | A1* | 9/2016 | Foss | G06F 3/0481 |
| 2018/0018084 | A1* | 1/2018 | Kim | G06F 3/0488 |

FOREIGN PATENT DOCUMENTS

| | | |
|---|---|---|
| KR | 10-2014-0025754 A | 3/2014 |
| KR | 10-2015-0095537 A | 8/2015 |

\* cited by examiner (a)

EVENT OCCURRED IN
SPECIFIC APPLICATION (b)

(a)

(b)

MOBILE TERMINAL AND CONTROL METHOD THEREOF

Cross Reference to Related Applications

This application is the National Phase of PCT International Application No. PCT/KR2016/012924, filed on Nov. 10, 2016, which claims priority under 35 U.S.C. 119(a) to Patent Application No. 10-2016-0100158, filed in the Republic of Korea on Aug. 5, 2016, all of which are hereby expressly incorporated by reference into the present application.

TECHNICAL FIELD

The present invention relates to a mobile terminal capable of more intuitively providing related applications, and a control method thereof.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

As functions of a mobile terminal are diversified, a user feels inconvenient in searching for a desired function because of an extended search time. Accordingly, the needs of users who want to perform desired functions more quickly and easily are increasing.

DETAILED DESCRIPTION OF THE DISCLOSURE

One aspect of the present invention is to provide a recommended application in an intuitive manner.

Another aspect of the present invention is to provide a user interface for searching for associated functions easily and quickly.

A mobile terminal according to the present invention may include a display unit to display a specific home screen page among a plurality of home screen pages, and a controller to execute an application corresponding to a specific icon included in the specific home screen page, in response to a touch input being applied to the specific icon, wherein the controller generates a temporary home screen page associated with the application, in response to a touch input of a preset type applied during the execution of the application, and wherein the temporary home screen page includes applications associated with the currently executed application.

In one embodiment, the temporary home screen page may include an icon of at least one of a recommended application recommended to be executed together with the currently executed application, an Internet connection address (URL) providing a function related to the currently executed application, and an application executable without installation in the mobile terminal.

In one embodiment, the controller may generate the temporary home screen page based on an occurrence of an event related to the specific icon.

In one embodiment, the temporary home screen page may include icons of a plurality of applications, and the controller may output at least one of the plurality of applications included in the temporary home screen page on the specific home screen page in the same arrangement manner as an output arrangement of the at least one application on the temporary home screen page when the at least one application is output on the specific home screen page.

In one embodiment, the controller may delete the temporary home screen page when the currently executed application is terminated.

In one embodiment, the controller may display the specific home screen page again on the display unit when the temporary home screen page is deleted.

In one embodiment, when a plurality of applications is being simultaneously executed, the controller may generate different temporary home screen pages respectively corresponding to the plurality of applications being executed, and the different temporary home screen pages may include applications associated with applications corresponding to the different temporary home screen pages, respectively.

In one embodiment, the controller may enter one of the different temporary home screen pages based on screen information displayed on the display unit.

In one embodiment, the controller may add an icon of a specific application on the temporary home screen page based on a user request.

In one embodiment, the controller may output an application list including icons of applications, in response to a touch of a preset type applied to the temporary home screen page, and add an icon of at least one application on the temporary home screen page among the icons of the applications included in the application list, based on a user request.

EFFECTS OF THE DISCLOSURE

According to a mobile terminal of the present invention as described above, information related to a currently executed application can be provided more intuitively by providing a temporary home screen page including recommended applications related to the currently executed application.

In addition, according to the present invention, a search time for applications associated with a currently executed application can be shortened by collectively providing recommended applications through a temporary home screen page.

Also, according to the present invention, a temporary home screen page can be deleted along with a termination of an application. This may result in preventing an increase in visual complexity of a display unit due to generation of the temporary home screen page.

BEST MODE FOR CARRYING OUT PREFERRED EMBODIMENTS

Figure 1:
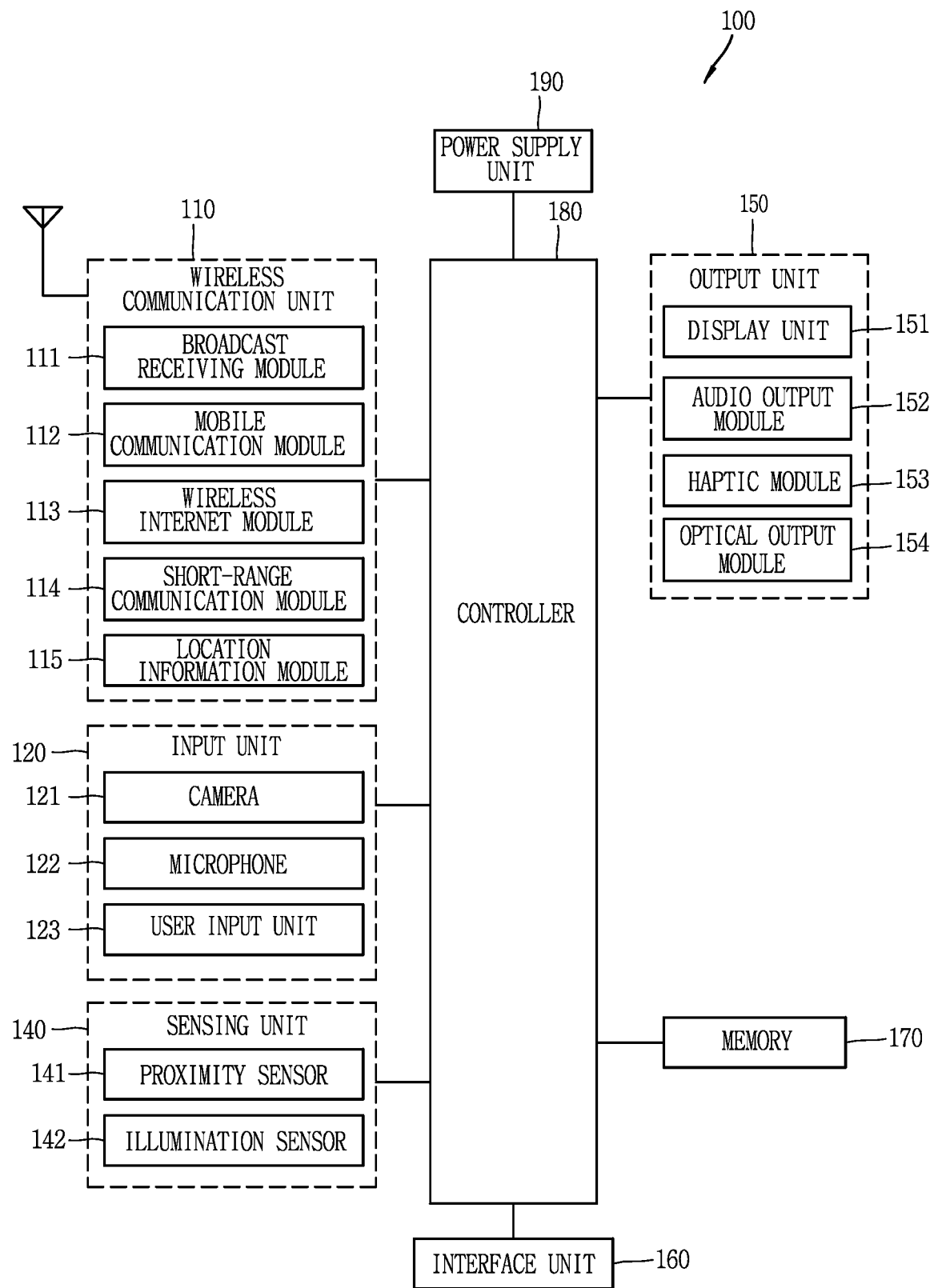
FIG. 1 is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIG. 1, FIG. 1 is a block diagram of a mobile terminal in accordance with the present invention.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In the following description, the same reference numerals are used for the same configurations.

Figure 2A:
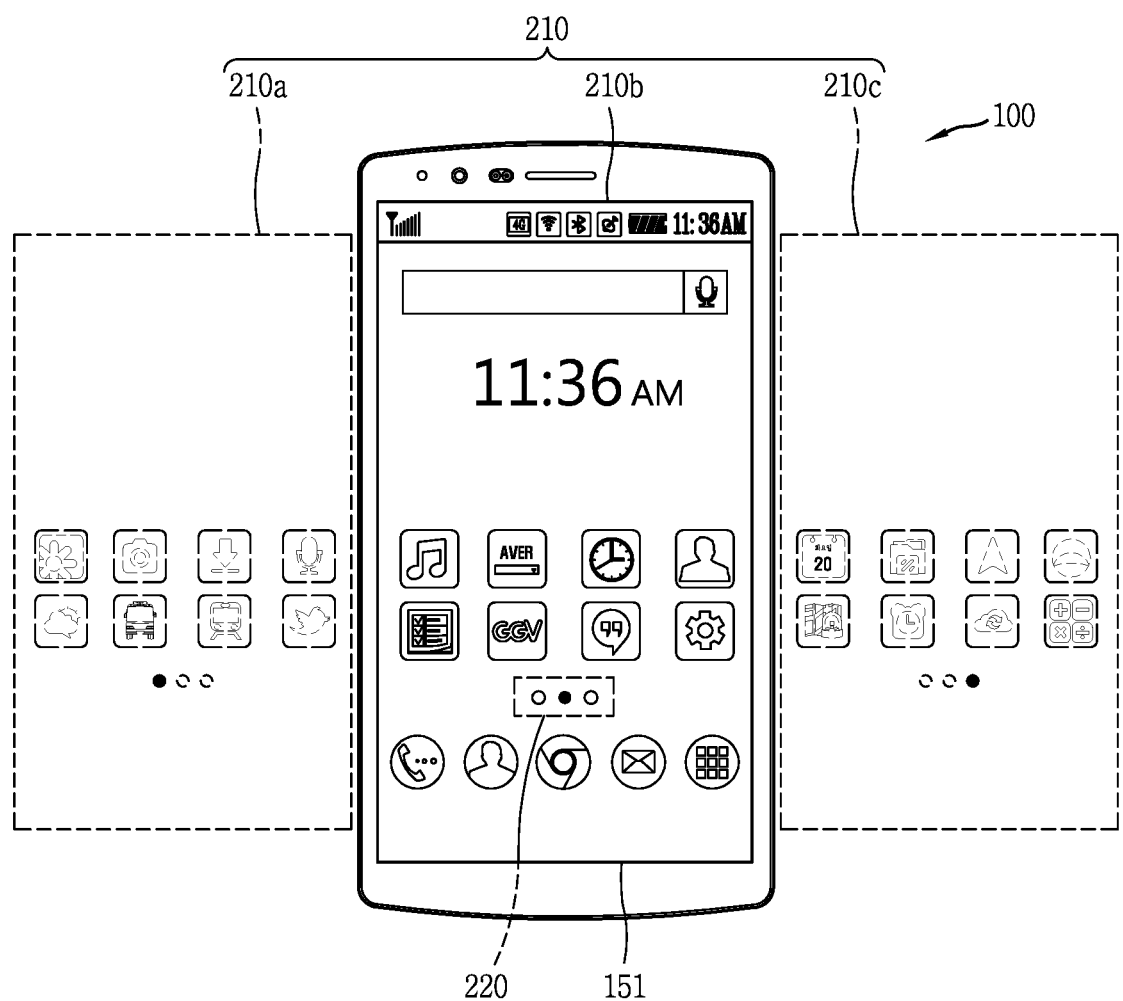
FIGS. 2A and 2B are conceptual views illustrating a home screen page.
Figure 2B:
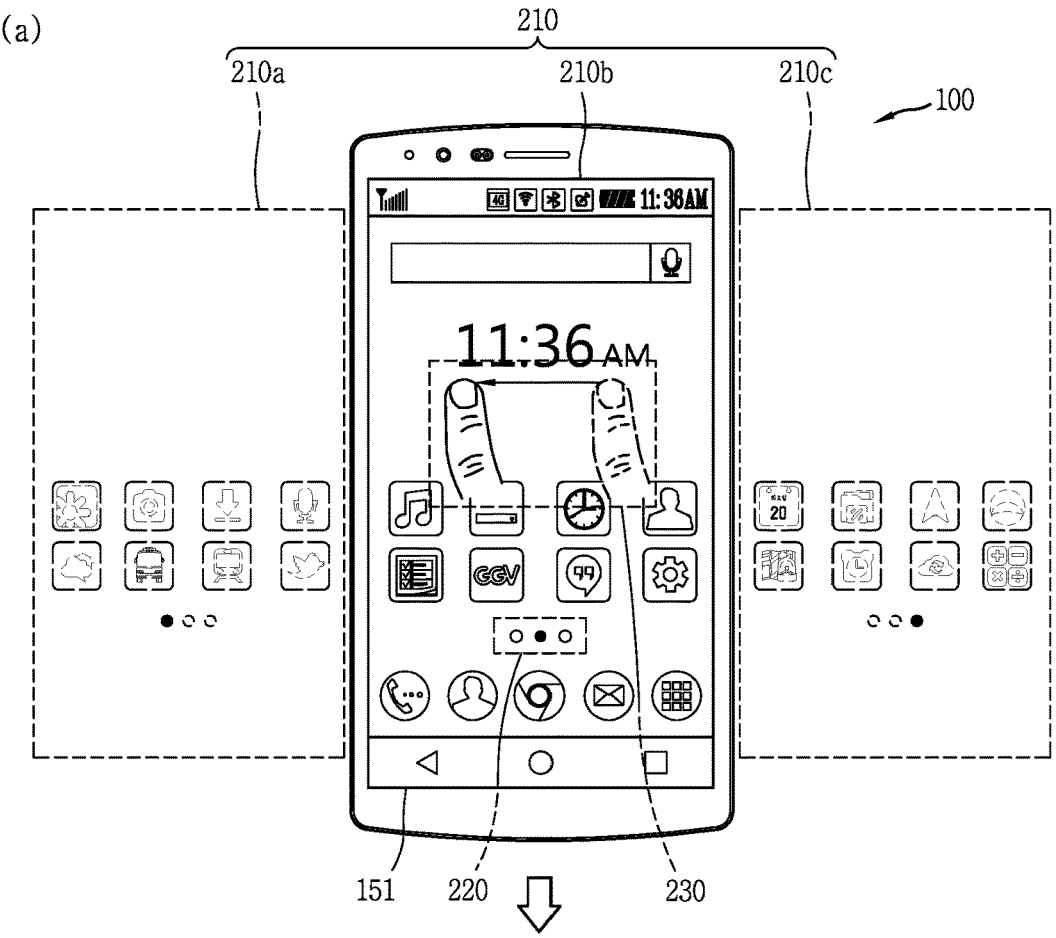
Figure 2B:
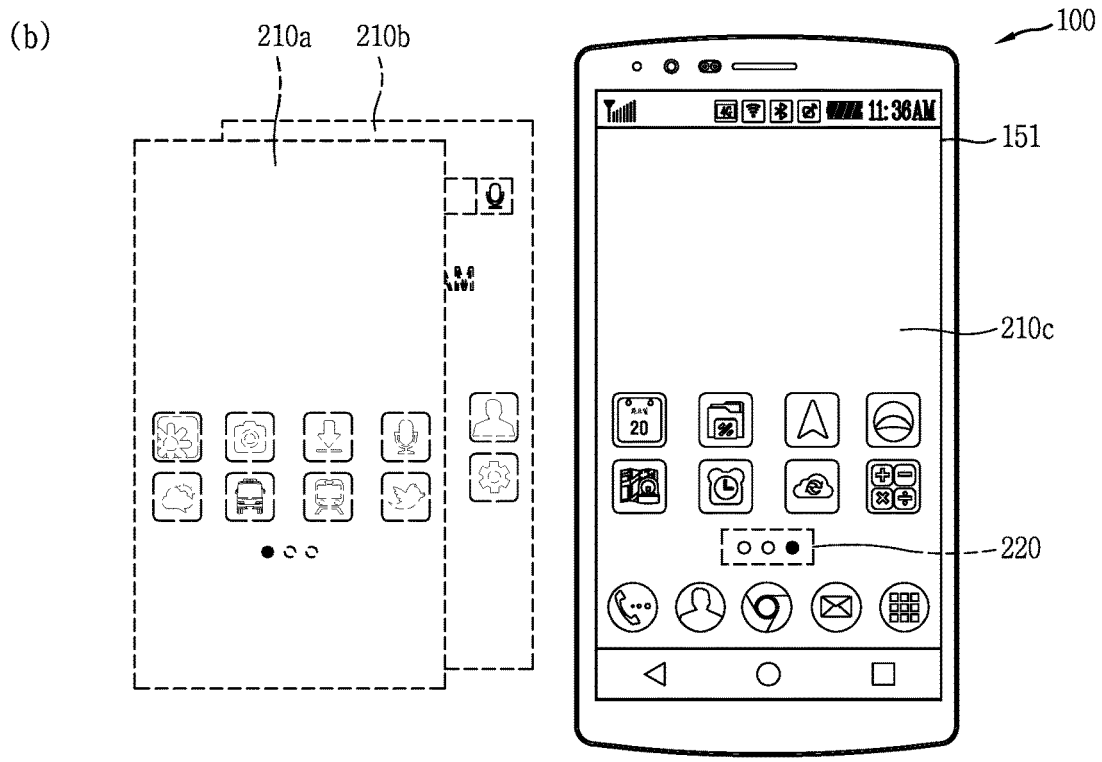

Hereinafter, description will be given of a method of providing a recommended application using a home screen page in a mobile terminal having at least one of the aforementioned components. FIGS. 2A and 2B are conceptual views illustrating a home screen page.

A home screen page is a graphic user interface displayed on the display unit 151 in an idle state of the mobile terminal.

A home screen page may include graphic objects such as icons or a widget. For example, as illustrated in FIG. 2A, the home screen page may include a plurality of icons.

The icons included in the home screen page may be included on the home screen page or may be excluded from the home screen page, depending on a user's setting. The exclusion from the home screen page means that such icon is no longer displayed on the home screen page.

The home screen page may be set as a plurality of home screen pages. For example, as illustrated in FIG. 2A, the mobile terminal may set a first home screen page 210a, a second home screen page 210b, and a third home screen page 210c. In this case, in the drawing, home screen pages indicated by a dotted line are home screen pages that are not output to the display unit 151, and a home screen page indicated by a solid line is a home screen page currently displayed on the display unit 151.

An arrangement order of the plurality of home screen pages may be set. For example, the first, second, and third home screen pages may be sequentially arranged from a left side of the user. Here, the arrangement order indicates relative positions among those home screen pages, and may also indicate an order in which the home screen pages are output.

In addition, the controller 180 may set a home page among a plurality of home screen pages. Here, the home page is a home screen page that is displayed when a home button is pressed or a home screen page that is displayed first after the mobile terminal is booted. The number of home screen pages and the home page may be set by a user.

Each of the home screen pages may further include an identification code indicating itself. For example, as illustrated in FIG. 2A, an identification code 220 indicating each home screen page may be displayed on one area.

The identification codes 220 may be displayed in a manner that an identification code indicating a home screen page currently displayed on the display unit 151 is distinguished from other identification codes. For example, as illustrated in FIG. 2A, when the second home screen page 210*b* is being displayed on the display unit 151, the identification code indicating the second home screen page 210*b* may be distinguished from the identification codes indicating the remaining home screen pages 210*a* and 210*c*. Thus, the user can intuitively confirm a relative position of the currently displayed home screen page among the plurality of home screen pages.

The controller 180 may shift (move, switch) the plurality of home screen pages based on a touch input applied to a home screen page. For example, as illustrated in (a) and (b) of FIG. 2B, the controller 180 may display the third home screen page 210*c* on the display unit 151, instead of the second home screen page 210*b*, when a flicking touch 230 of a first direction is applied to the second home screen page 210*b*.

Similarly, although not shown, the controller 180 may display the first home screen page 210*a* on the display unit 141, instead of the second home screen page 210*b*, when a flicking touch of a second direction which is opposite to the first direction is applied.

That is, the controller 180 may shift or move the plurality of home screen pages according to a direction that a touch input is applied.

The foregoing description has been given of a general home screen page. Hereinafter, a method of providing a home screen page that provides a recommended application, in a mobile terminal according to the present invention will be described.

Figure 3:
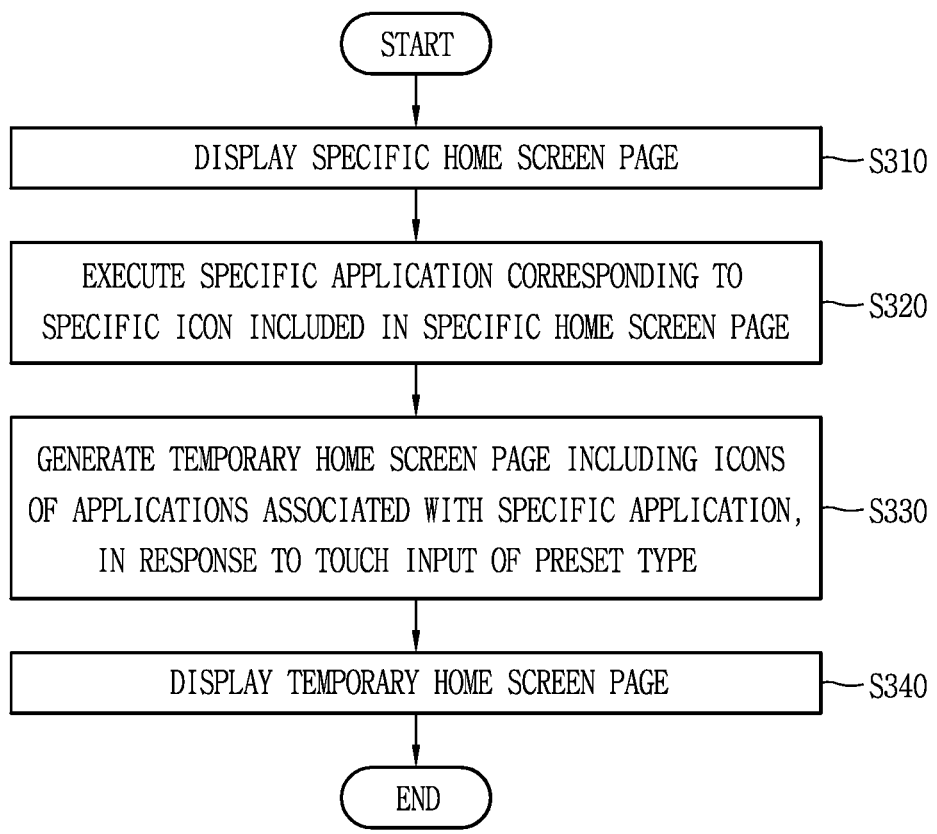
FIG. 3 is a flowchart illustrating a method of providing a recommended application in a mobile terminal according to the present invention.
Figure 4:
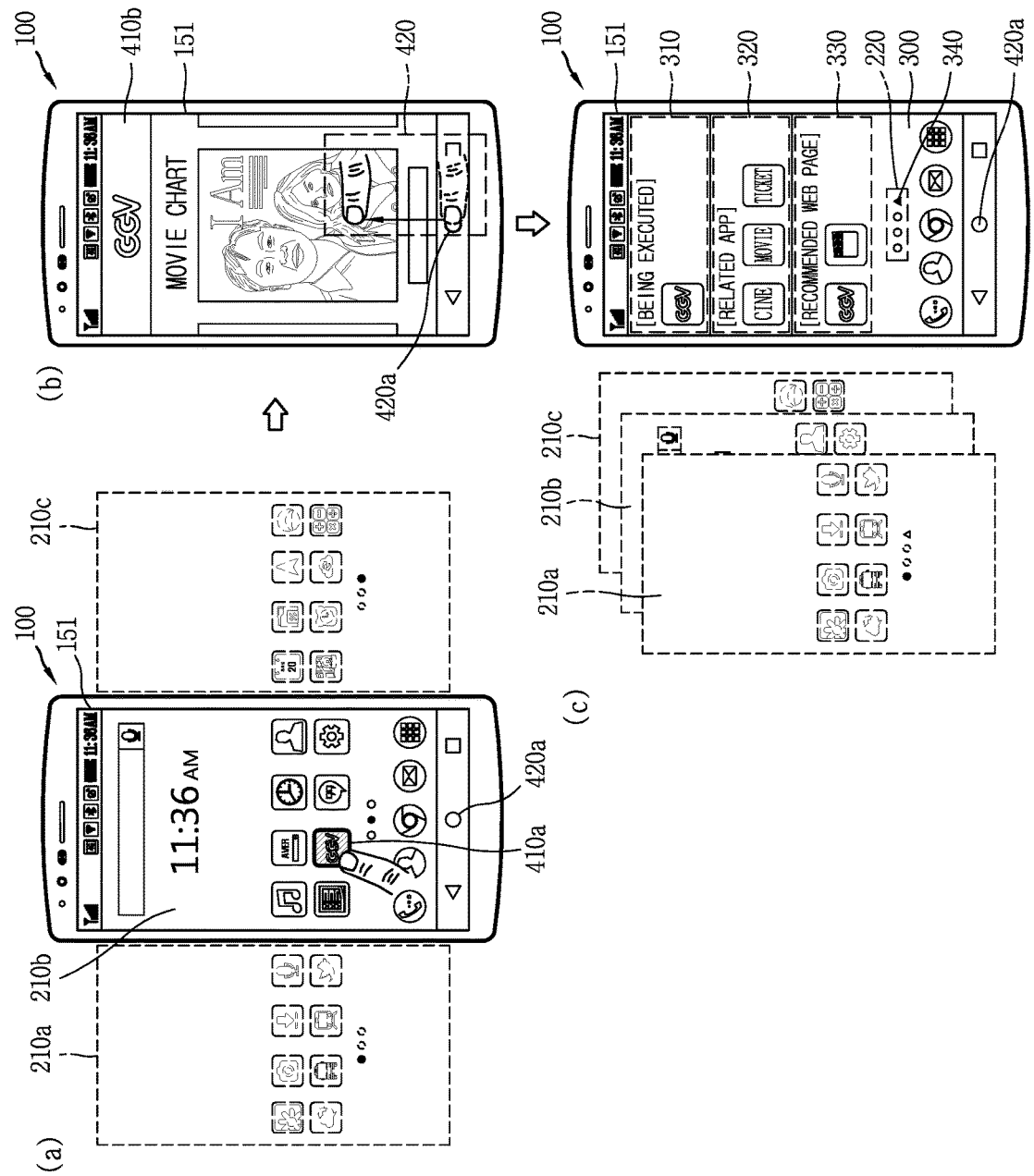
FIG. 4 is a conceptual view illustrating the control method of FIG. 3.

FIG. 3 is a flowchart illustrating a method of providing a recommended application in a mobile terminal according to the present invention, and FIG. 4 is a conceptual view illustrating the control method of FIG. 3.

Referring to FIG. 3, the controller 180 may display a specific home screen page on the display unit 151 (S310).

The controller 180 may display a specific home screen page among a plurality of home screen pages on the display unit 151. The specific home screen page may be set to be displayed by a user, or may be a home screen page set as a home page.

Thereafter, the controller 180 may execute a specific application corresponding to a specific icon included in the specific home screen page (S320).

The specific home screen page may include at least one icon and widget. The at least one icon and widget may be included on the specific home screen page by a user's control command.

The at least one icon and widget may be an icon or widget corresponding to an application installed in the memory 170 of the mobile terminal. Also, the at least one icon and widget may be a graphic object corresponding to a uniform resource locator (URL) of a web page. The graphic object corresponding to the URL of the web page may also be understood as a shortcut icon or a favorite icon of the web page.

The controller 180 may execute a specific application based on a user control command.

More specifically, as illustrated in (a) of FIG. 4, the controller 180 may detect that a touch input is applied to a specific icon 410*a* among at least one icon and widget. In this case, as illustrated in (b) of FIG. 4, the controller 180 may execute a specific application corresponding to the specific icon 410*a*, in response to the touch input applied to the specific icon 410*a*.

When the specific application is executed, an execution screen 410*b* of the specific application may be displayed on the display unit 151.

During the execution of the specific application, the controller 180 may generate a temporary home screen page including icons of applications related to the specific application, in response to a touch input of a preset type (S330).

After the execution of the specific application, the controller 180 may generate a temporary home screen page based on a touch input of a preset type.

The preset type of touch input may be set at the time of shipment of the mobile terminal. For example, the preset type of touch input may be a flicking input that is applied from a boundary area of a lower end of a touch screen toward an upper area. As another example, as illustrated in (b) of FIG. 4, the preset type of touch input may be a flicking touch 420 that starts from an area where a home key 420*a* is displayed and moves from a lower end to an upper end of the mobile terminal. Here, the home key 420*a* is a key that is linked to a function for entering a home screen page set as a home page among a plurality of home screen pages, and may be implemented in software or hardware.

Alternatively, the controller 180 may generate the temporary home screen page as soon as the execution of the specific application. That is, the controller 180 may generate a temporary home screen page even without a touch input of a preset type.

On the other hand, the controller 180 may set a temporary home screen page for at least one of a plurality of applications installed in the mobile terminal based on a user selection. That is, the present invention may not generate temporary home screen pages for all applications but generate a temporary home screen page only when executing at least one application for which the temporary home screen page has been set to be generated.

The temporary home screen page is a home screen page associated with a specific application, and may include icons of applications associated with the specific application.

In addition, the temporary home screen page may be a home screen page which has been temporarily set as a home screen page and then stored in the memory 170. Thus, the temporary home screen page may be accessed in the same manner as a general home screen page, and additionally, may have the same characteristics as those of the general home screen page. However, the temporary home screen page is a temporarily generated home screen page, and thus may be automatically deleted if a predetermined condition is satisfied.

Also, a plurality of temporary home screen pages may be set. In this case, each temporary home screen page may be a home screen page associated with a different application.

An identification code 340 indicating the temporary home screen page may be displayed in a manner of being visually distinguished from identification codes indicating a plurality of home screen pages. For example, the identification code 340 indicating the temporary home screen page may be triangular and the identification codes indicating the plurality of home screen pages may be circular in shape.

In addition, the temporary home screen page may be arranged on the right side relative to the plurality of home screen pages, or on the right or left side of a home screen page including a specific application.

When the temporary home screen page is generated, the controller 180 may display the temporary home screen page on the display unit 151 (S340).

As illustrated in (c) of FIG. 4, the controller 180 may output a temporary home screen page 300 on the display unit 151.

The temporary home screen page is a home screen page containing information related to a currently-executed specific application. The temporary home screen page may be divided into a plurality of regions according to a predetermined criterion.

More specifically, the temporary home screen page may be divided into a first region 310 for displaying an icon of a currently-executed specific application, a second region 320 for displaying an icon of a recommended application, and a third region 330 for displaying an icon associated with a website address.

First, an application that is being executed may be displayed in the first region 310. Then, the second region 320 may include therein icons of recommended applications associated with the specific application currently being executed.

The recommended application may be an application having an attribute similar to the specific application, an application frequently executed together with the specific application, or an application searched for in association with the specific application through an Internet network. The application frequently executed together with the specific application may be extracted by a usage pattern of the specific application.

For example, as illustrated in (c) of FIG. 4, if a specific application is a movie application providing information related to movies, the recommended application may be an application providing a movie reservation function, an application providing cinema information, or the like. As another example, the recommended application may be an Internet application or a messenger application which is executed frequently with the movie application.

On the other hand, the recommended application may be an application installed in the mobile terminal or an application before being installed in the mobile terminal. The application installed in the mobile terminal is an operation of the mobile terminal that stores information related to an execution of the application in the memory 170 and allows the application to be executed on the mobile terminal.

The application before being installed in the mobile terminal may be an application of which installation file is merely stored in the mobile terminal or an application of which summary information is merely stored in the mobile terminal. The summary information may be brief attribute information regarding the application.

In addition, the application before being installed in the mobile terminal may be an application which is executable without being installed in the mobile terminal. This application may be called an instant application (instant App).

The instant application refers to an application that is driven by installing only core files in a modularized manner, other than installing all the files required for executing the application. That is, the user can execute a core function of the application even if the user does not install the application on the mobile terminal.

In addition, the controller 180 performs a different function according to a type of home screen page including an icon of the instant application. For example, when an icon of an instant application is included on a general home screen page, the controller 180 may perform an operation of installing the instant application, in response to a request for executing the instant application. As another example, when the icon of the instant application is included on a temporary home screen page, the controller 180 may download only a core module of the instant application, in response to a request for executing the instant application, and then execute the instant application without an installation of the entire instant application.

The third region 330 may include therein an icon associated with a web page URL. For example, as illustrated in (c) of FIG. 4, the temporary home screen page may include an icon linked to a movie site URL address when a specific application is a movie application.

The user can more easily access applications associated with a specific application through icons of the associated applications included in a temporary home screen page. Also, a search time for searching for the icons of the applications associated with the specific application can be shortened.

On the other hand, the controller 180 may control the temporary home screen page to disappear from the display unit 151, in response to a touch input of a preset type being applied to the temporary home screen page.

In this case, the controller 180 may output a home screen page set as a home page on the display unit 151, instead of the temporary home screen page. Alternatively, the controller 180 may display the execution screen 410b (see FIG. 4) of the specific application again, instead of the temporary home screen page.

In the foregoing, a method of providing a recommended application related to a currently executed application through a temporary home screen page has been described.

Figure 5A:
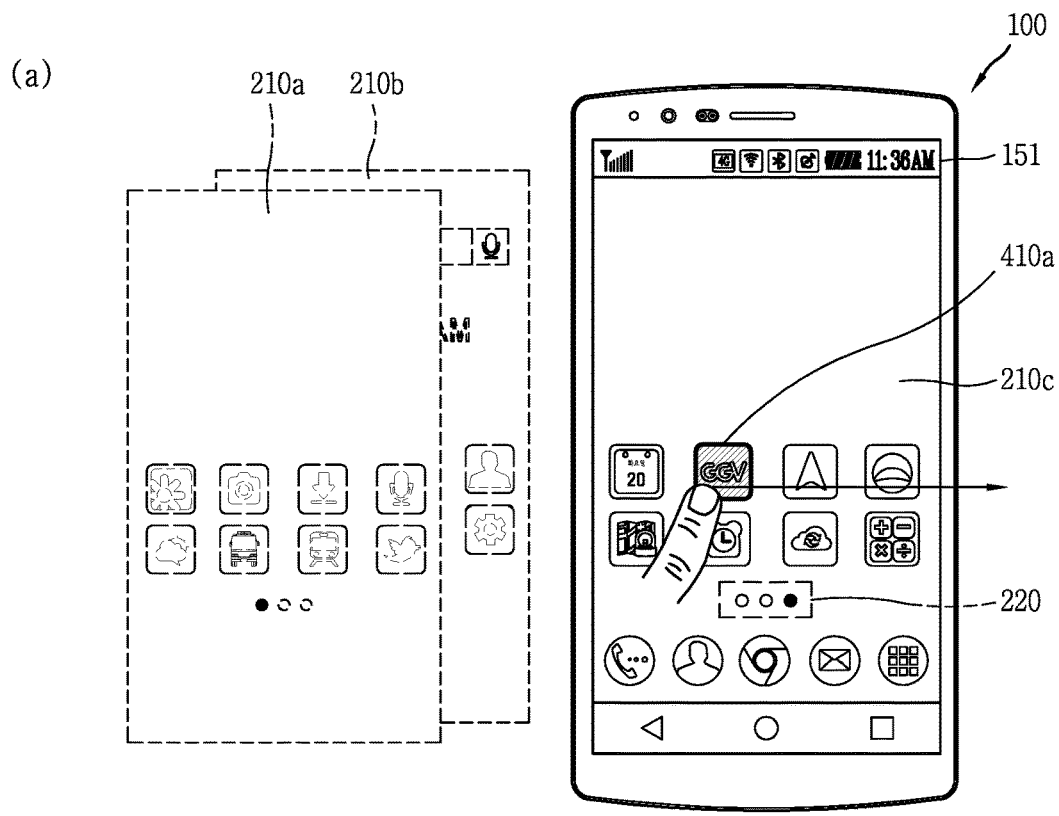
FIGS. 5A and 5B are conceptual views illustrating examples in which a temporary home screen page is generated.
Figure 5A:
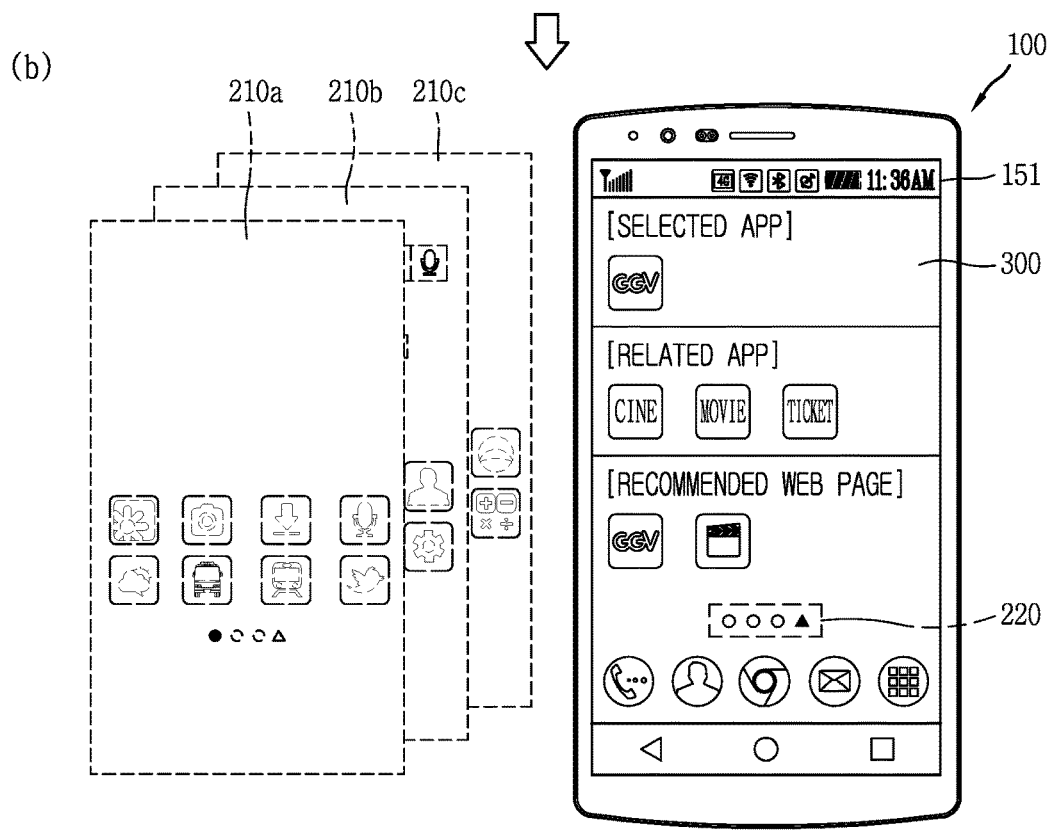
Figure 5B:
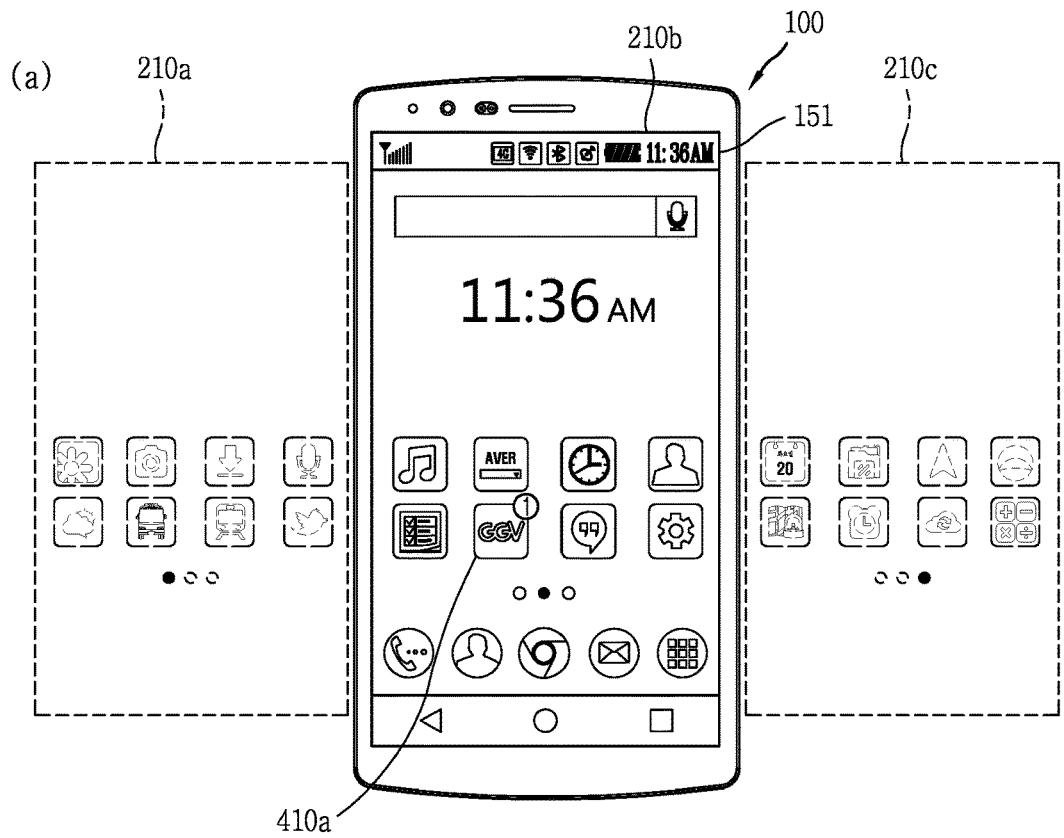
Figure 5B:
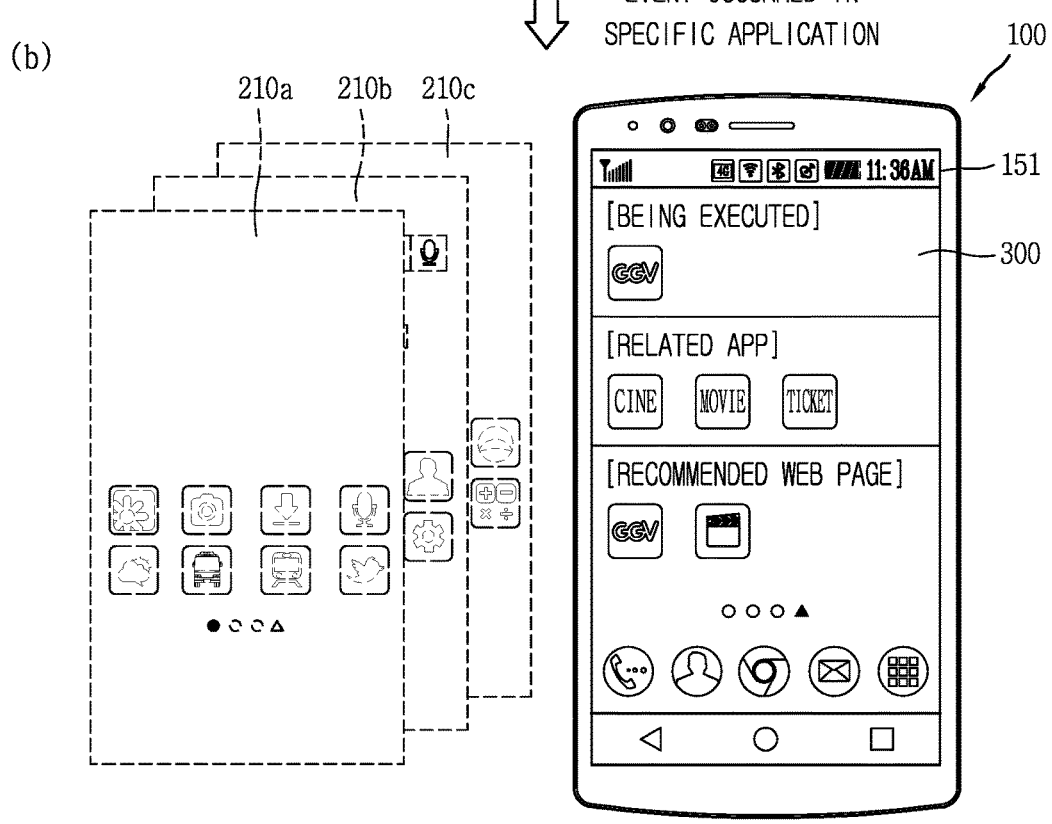

Hereinafter, examples in which a temporary home screen page is generated, in addition to the aforementioned conditions, will be described. FIGS. 5A and 5B are conceptual views illustrating examples in which a temporary home screen page is generated.

The controller 180 may generate a temporary home screen page based on satisfaction of a preset condition.

The preset condition may be a condition that a drag input is applied to an icon of a specific application in a specific direction, or a condition that an event occurs in a specific application.

For example, as illustrated in (a) of FIG. 5A, the controller 180 may detect a touch input which is applied in a specific direction to an icon 410a of a specific application on a third home screen page 210c, which is located at the last of first to third home screen pages 210a, 210b and 210c.

The specific direction may be a direction toward an opposite side to a position at which the first and second home screen pages are arranged. That is, the specific direction may be a direction in which a currently set home screen page is not located.

In this case, as illustrated in (b) of FIG. 5A, the controller 180 may generate a temporary home screen page 300 related to the specific application and display the temporary home screen page 300 on the display unit 151. Thus, the user can access information more intuitively by providing information related to applications related to an application that the user has selected through a home screen page.

As another example, as illustrated in (a) of FIG. 5B, the controller 180 may detect that an event occurs in the specific application corresponding to the icon 410a included in the second home screen page 210b. The specific application may be an application which has been set to create a temporary home screen page when an event occurs.

The event may be a schedule notification event preset in an application, or an event of receiving information related to an application from an external server or an external terminal.

As illustrated in (b) of FIG. 5B, when the event occurs, the controller 180 may generate a temporary home screen page 300 related to the specific application, and output the generated temporary home screen page 300 to the display unit 151.

Through this, the present invention can generate a temporary home screen page related to a specific application in various ways.

In the above, examples in which a temporary home screen page is generated have been described.

Figure 6A:
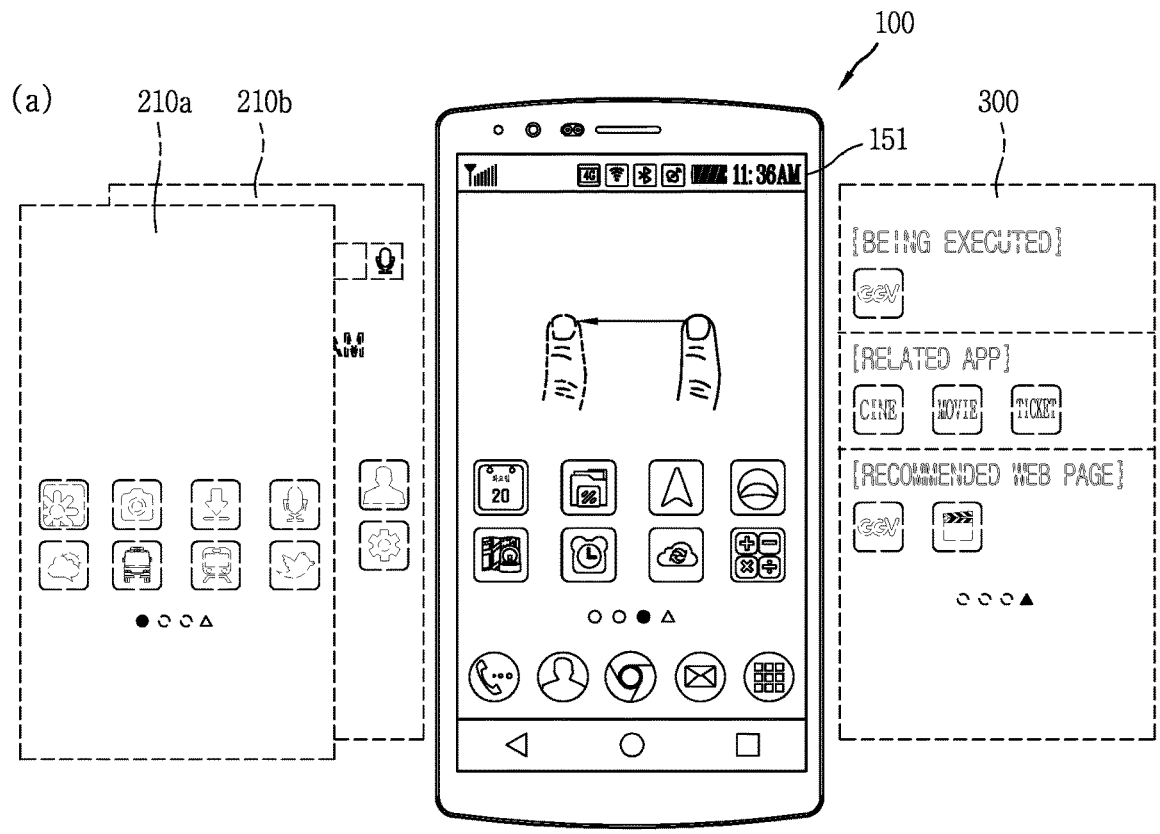
FIGS. 6A and 6B are conceptual views illustrating a method of entering a temporary home screen page.
Figure 6A:
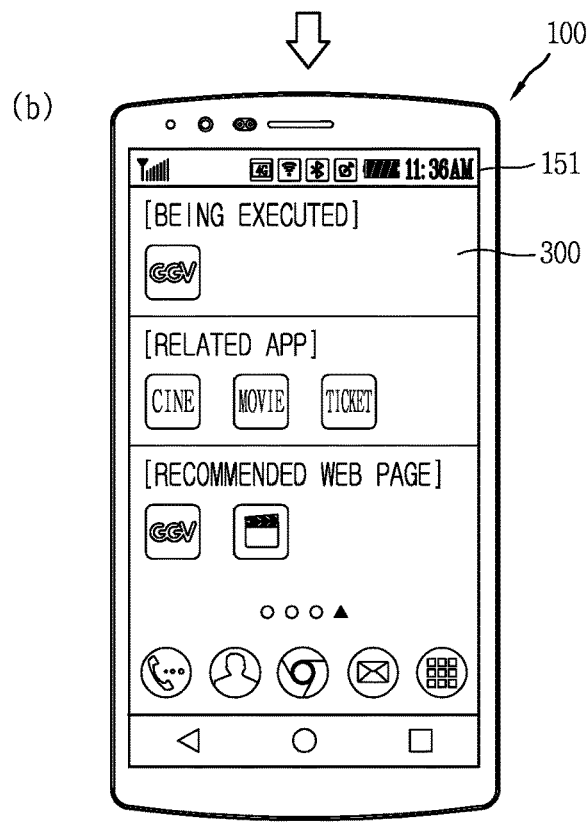
Figure 6B:
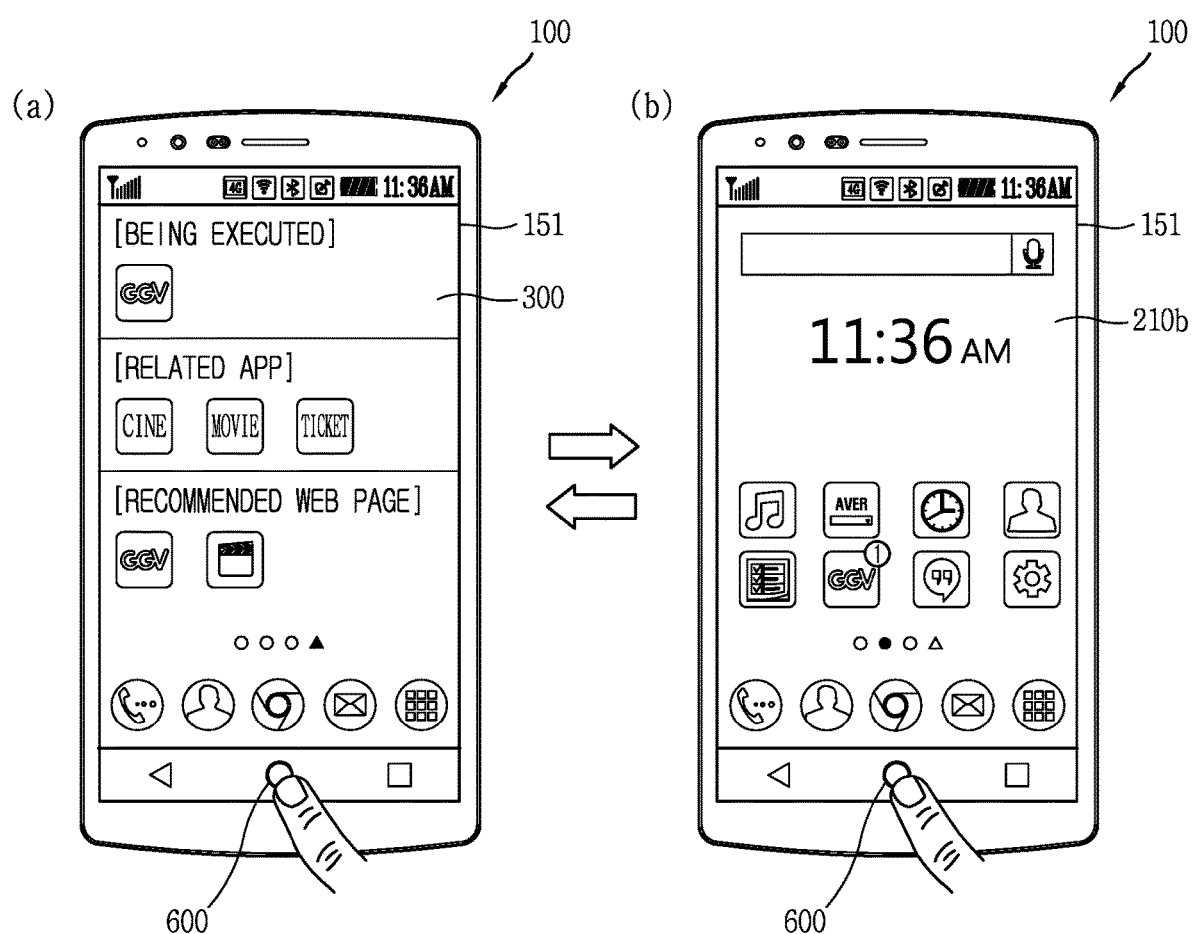

Hereinafter, a method of entering a temporary home screen page will be described. FIGS. 6A and 6B are conceptual views illustrating a method of entering a temporary home screen page.

The controller 180 may enter a temporary home screen page in the same manner as a general home screen page. Entering a home screen page refers to an operation that another home screen page is displayed on the display unit 151 instead of a currently displayed home screen page.

For example, as illustrated in (a) of FIG. 6A, first to third home screen pages 210a, 210b and 210c and a temporary home screen page 300 may be set in the mobile terminal.

In this case, the controller 180 may shift the plurality of home screen pages 210a, 210b, and 210c and the temporary home screen page 300 in response to a flicking touch input applied on the display unit 151.

For example, as illustrated in (a) and (b) of FIG. 6A, the controller 180 may shift from the third home screen page 210c to the temporary home screen page 300 in response to a flicking touch input being applied.

That is, the user can enter a temporary home screen page in the same manner as a general home screen page.

In addition, the controller 180 may alternately enter a home page and a temporary home screen page by applying a user input to a home key 600.

The user input applied to the home key 600 may be a touch input applied to the home key 600 when the home key 600 is implemented in software configuration. On the other hand, the user input may be a push input applied to the home key 600 when the home key 600 is implemented in hardware configuration.

For example, as illustrated in (a) of FIG. 6B, when a touch input is applied to the home key 600, the controller 180 may display the second home screen page 210b, which has been set as a home page, on the display unit 151 in place of the temporary home screen page. Similarly, when a touch input is applied to the home key 600, the controller 180 may display the temporary home screen page 300, which has been set as the home page, on the display unit 151 in place of the second home screen page 210b.

The foregoing description has been given of a method of entering a temporary home screen page.

Figure 7A:
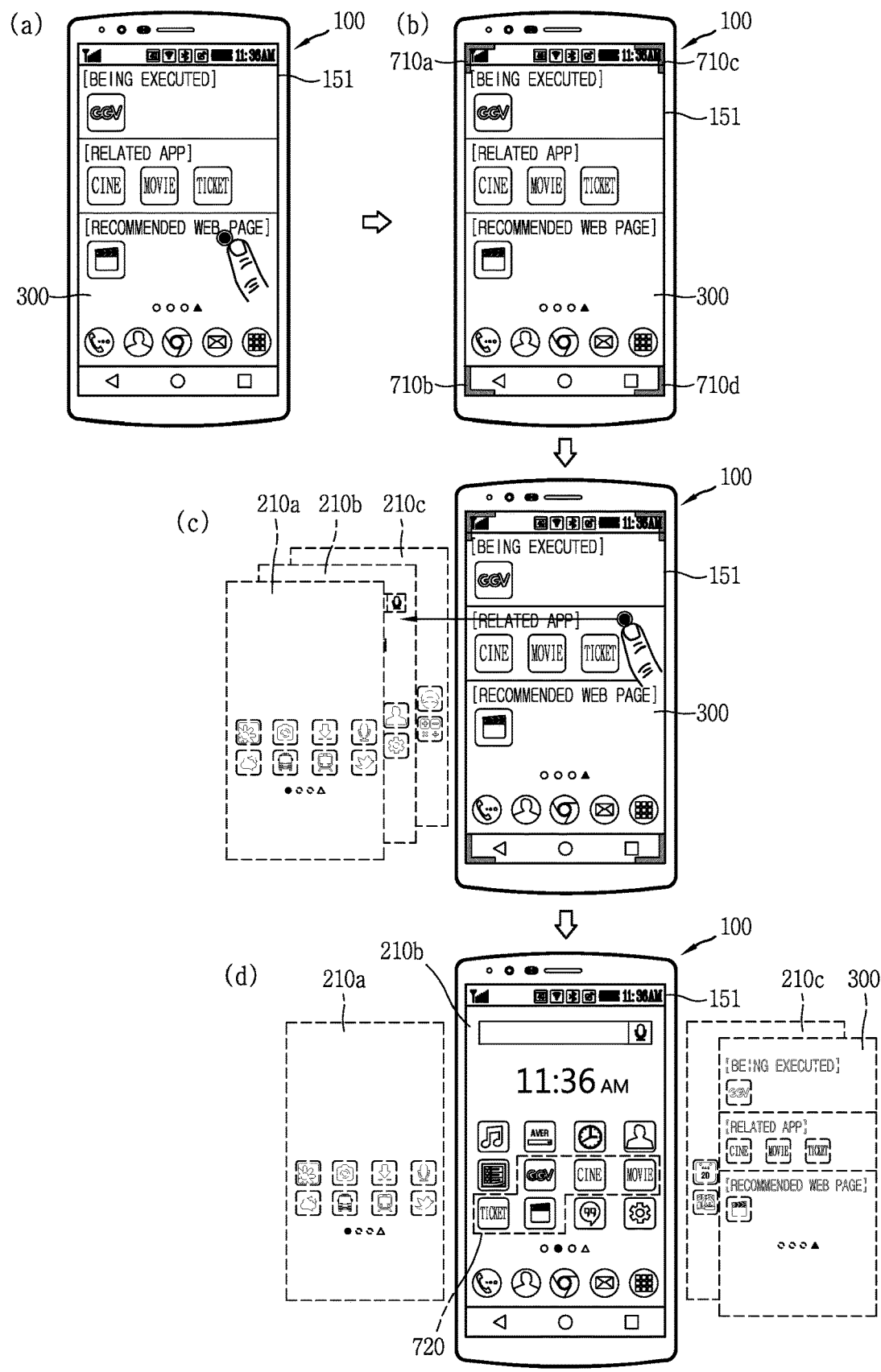
FIGS. 7A and 7B are conceptual views illustrating a method of moving an application included in a temporary home screen page to a general home screen page.
Figure 7B:
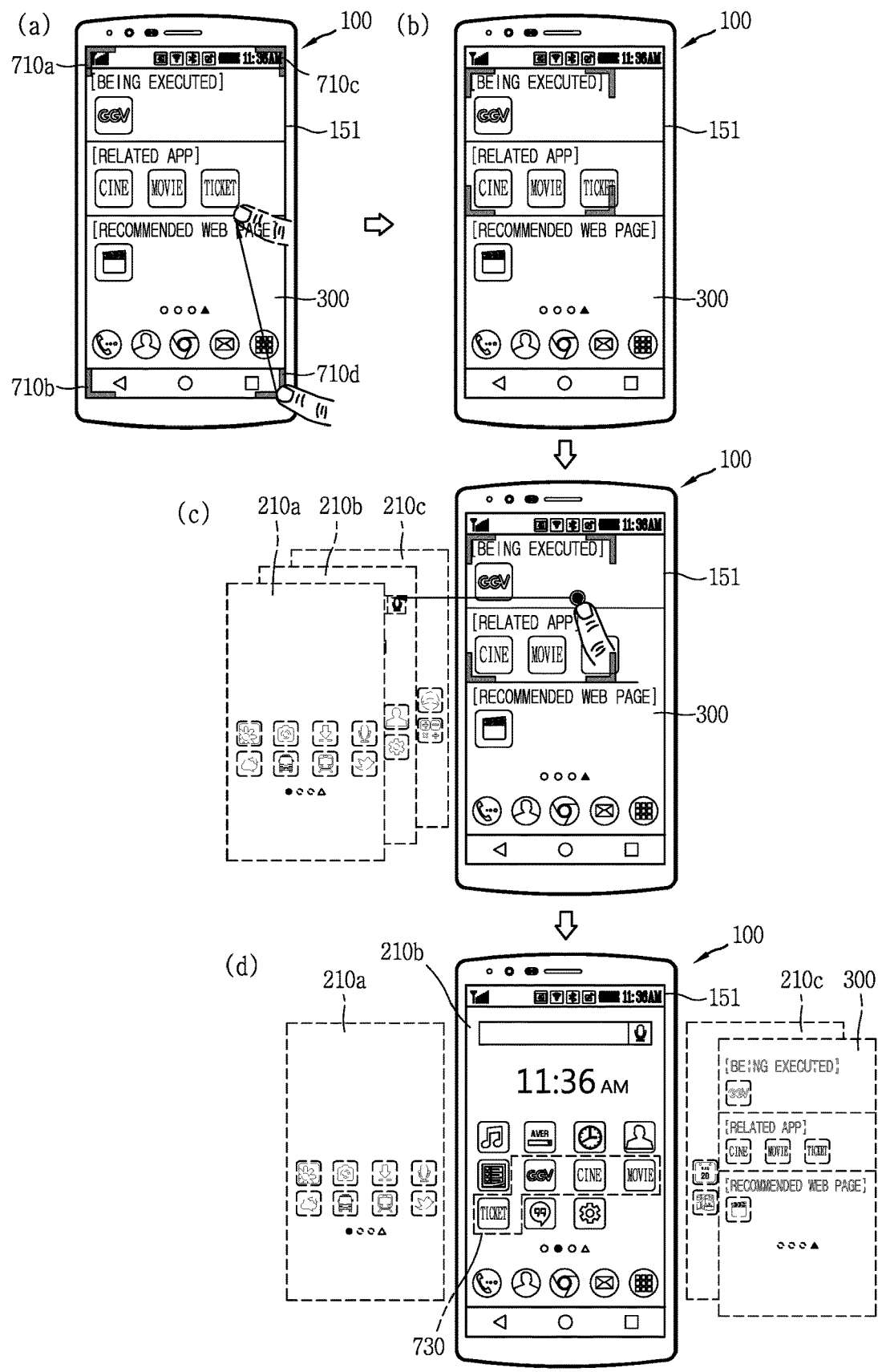

Hereinafter, a method of moving an icon of an application included in a temporary home screen page to a general home screen page will be described. FIGS. 7A and 7B are conceptual views illustrating a method of moving an application included in a temporary home screen page to a general home screen page.

The controller 180 may execute an editing mode of a temporary home screen page based on a user's control command. For example, as illustrated in (a) of FIG. 7A, the controller 180 may execute an editing mode in response to a long touch applied to the display unit 151 while a temporary home screen page is displayed.

The editing mode may refer to an operation state of a mobile terminal in which an icon of an application included in a temporary home screen page can be set to be displayed on a general home screen page. Also, the editing mode may refer to an operation state of the mobile terminal in which an output position of an icon of an application included in a temporary home screen page can be changed.

Also, the editing mode may refer to an operation state of the mobile terminal in which an icon of an application included in a temporary home screen page can be deleted or an icon of a new application can be added.

As illustrated in (b) of FIG. 7A, when the editing mode is executed, editing objects 710a, 710b, 710c, and 710d may be displayed on the display unit 151.

The editing objects 710a, 710b, 710c, and 710d may be graphical objects for selecting an application included in a temporary home screen page. The controller 180 may set icons positioned inside a box having vertexes, which correspond to the editing objects 710a, 710b, 710c, and 710d, as icons to be edited (editing target icons).

For example, as illustrated in (c) of FIG. 7A, the controller 180 may set icons, which are included in the temporary home screen page 300 located inside the box having the vertexes of the editing objects 710a, 710b, 710c, and 710d, as icons to be edited.

The controller 180 may select icons using the editing objects and move the selected icons to be displayed on a general home screen page.

For example, as illustrated in (d) of FIG. 7A, the controller 180 may display icons on the second home screen page 210b, in response to a drag input being applied to the icons to be edited.

At this time, the controller 180 may display the selected icons by moving them to an output position of the second home screen page 210b which corresponds to an output position where the selected icons are displayed on the temporary home screen page. That is, as illustrated in (d) of FIG. 7A, the selected icons 720 may be displayed on the general home screen page in the same arrangement manner as the arrangement of the icons in the temporary home screen page.

On the other hand, the controller 180 may determine icons to be edited based on a change in a size of the editing objects.

For example, as illustrated in (a) and (b) of FIG. 7B, the controller 180 may reduce a size of the box made by the editing objects 710a to 710d, in response to a touch input applied to the editing objects 710a to 710d.

In this case, as illustrated in (c) of FIG. 7B, the controller 180 may set only four icons included in the box as icons to be edited. Thereafter, the icons to be edited may change in the same manner as shown in (c) and (d) of FIG. 7A.

Accordingly, as illustrated in (d) of FIG. 7A, the controller may collectively display the icons 730 to be edited.

That is, the present invention can equally set even an arrangement of icons when moving the icons, as well as simply moving icons between home screen pages. Thus, the user can collectively check related icons.

The foregoing description has been given of a method of using an arrangement of icons of a temporary home screen page.

Figure 8:
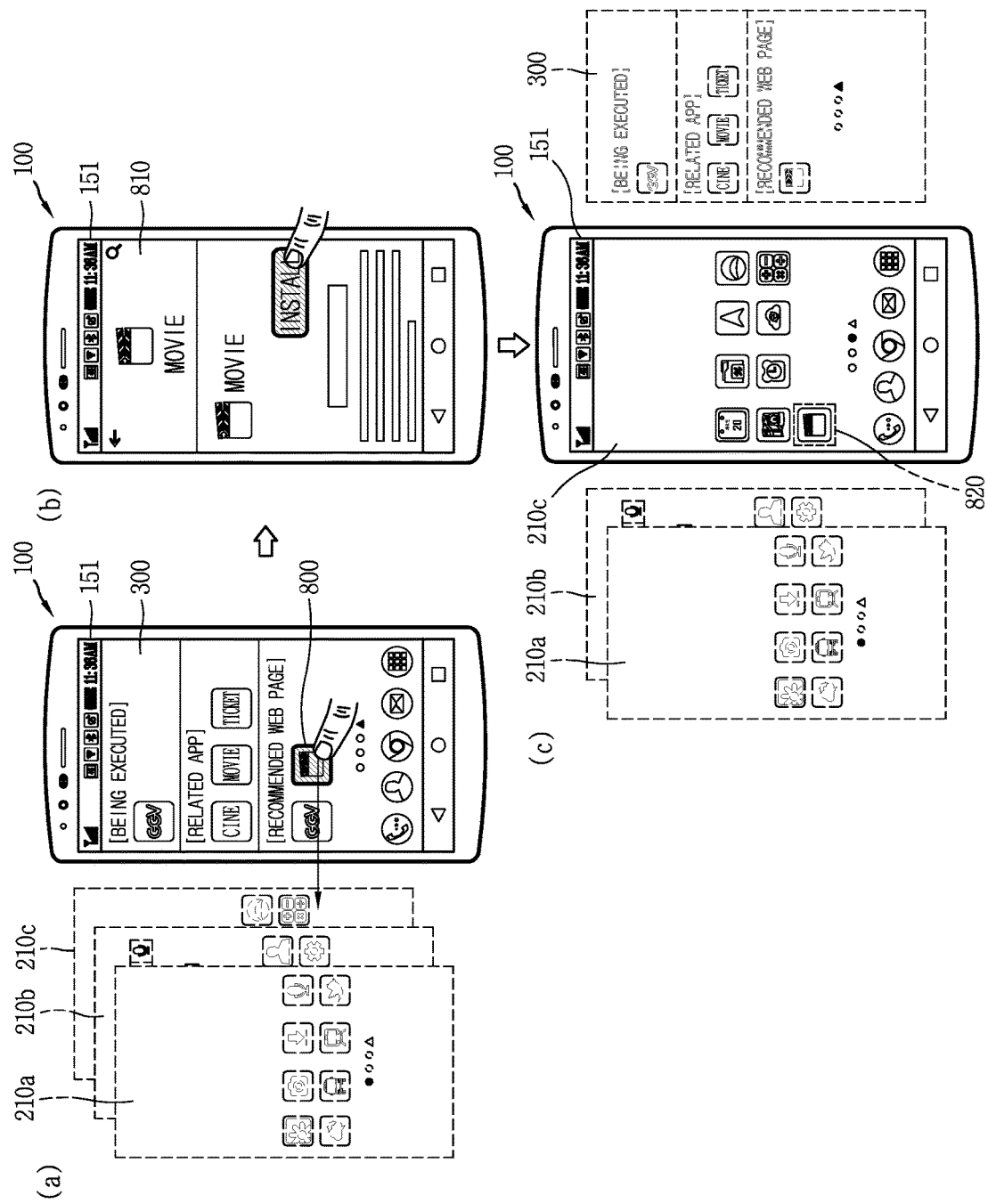
FIG. 8 is a conceptual view illustrating an example of executing an application included in a temporary home screen page.

Hereinafter, an example of executing an application included in a temporary home screen page will be described. FIG. 8 is a conceptual view illustrating an example of executing an application included in a temporary home screen page.

The controller 180 may move icons of applications included in a temporary home screen page to a general home screen page and display the icons on the general home screen page, based on a user's control command.

At this time, the controller 180 may perform a different function according to a type of icon of an application included in the temporary home screen page.

More specifically, when an icon of an application pre-installed in the mobile terminal is moved from the temporary home screen page to the general home screen page, the controller 180 may execute a first function of displaying the icon on the general home screen page.

In addition, when an icon of an application which has not been installed in the mobile terminal is moved from the temporary home screen page to the general home screen page, the controller 180 may execute a second function of installing the application corresponding to the icon.

For example, as illustrated in (a) of FIG. 8, the controller 180 may move a specific icon 800 included in a temporary home screen page to the third home screen page 210*c*, in response to a drag input being applied to the specific icon 800.

At this time, the controller 180 may determine whether the application corresponding to the specific icon 800 has been installed, before moving the specific icon 800. When it is determined that the application corresponding to the specific icon 800 has not been installed, the controller 180 may display an installation screen 810 of the application on the display unit 151, as illustrated in FIG. (b) of FIG. 8.

Afterwards, as illustrated in (c) of FIG. 8, when the application is installed, the controller 180 may output an icon 820 corresponding to the installed application to the third home screen page 210*c*.

Although not shown, when an icon of an instant application is included on the temporary home screen page, the controller 180 may activate the instant application without installing the instant application, in response to an execution request for the instant application.

Meanwhile, when the instant application is moved to the general home screen page, the controller 180 may execute an operation for installing the instant application. That is, the controller 180 can perform the installation operation as soon as the movement of the instant application.

That is, the present invention can simultaneously execute installation and movement of an application corresponding to an icon.

In the foregoing, an embodiment of moving an application in the mobile terminal according to the present invention has been described.

Figure 9A:
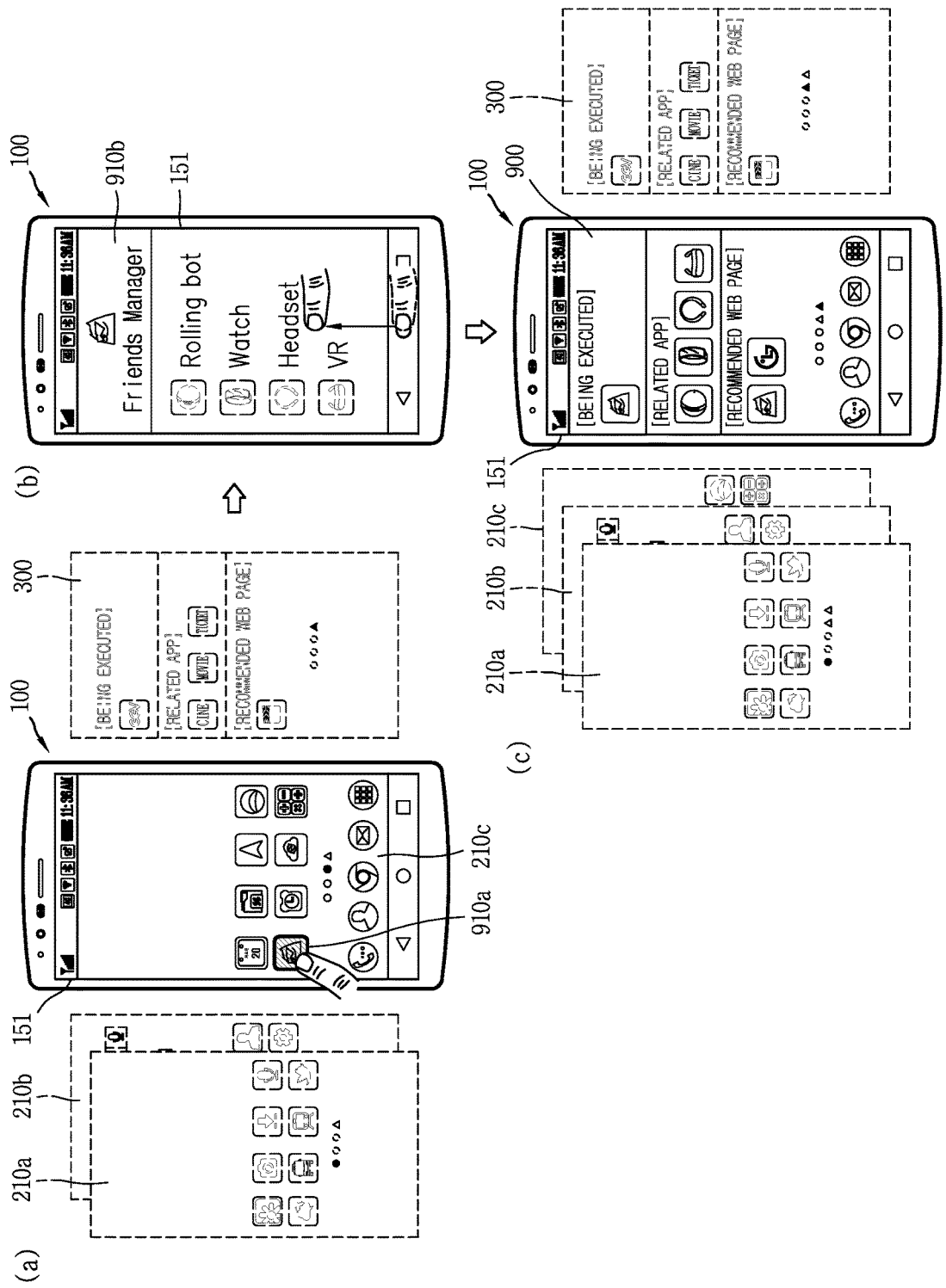
FIGS. 9A to 9C are conceptual views illustrating a control method when a plurality of temporary home screen pages is set.
Figure 9B:
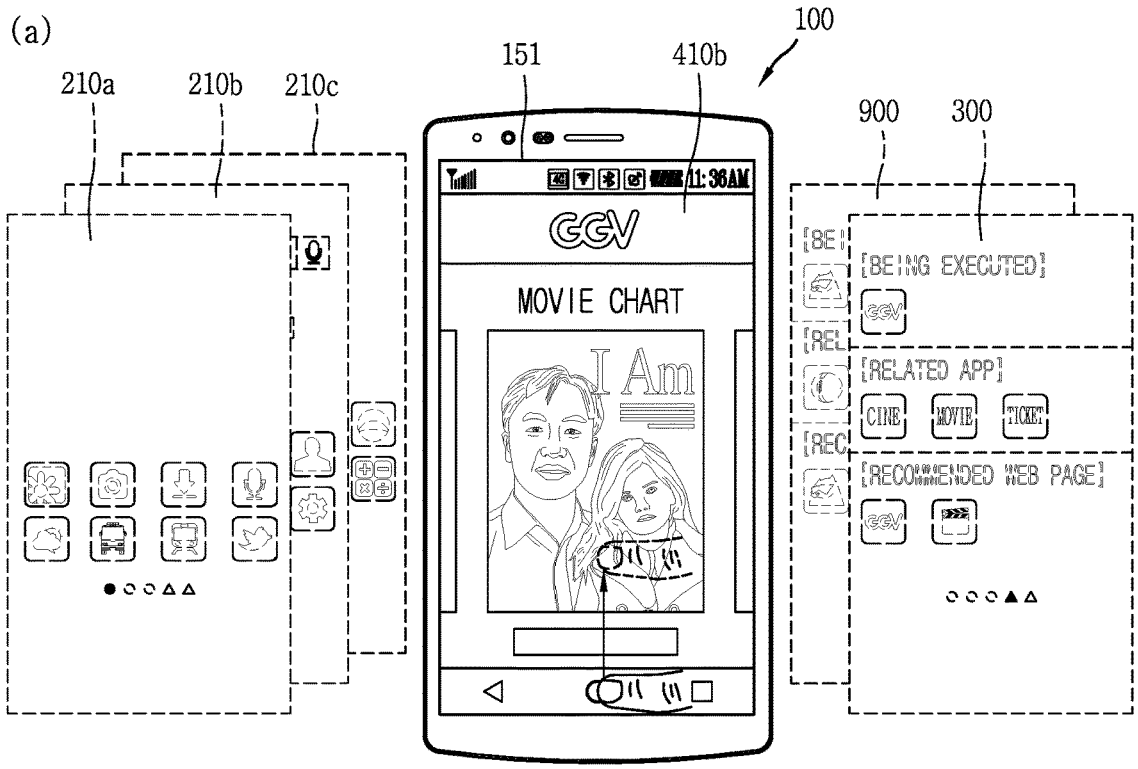
Figure 9B:
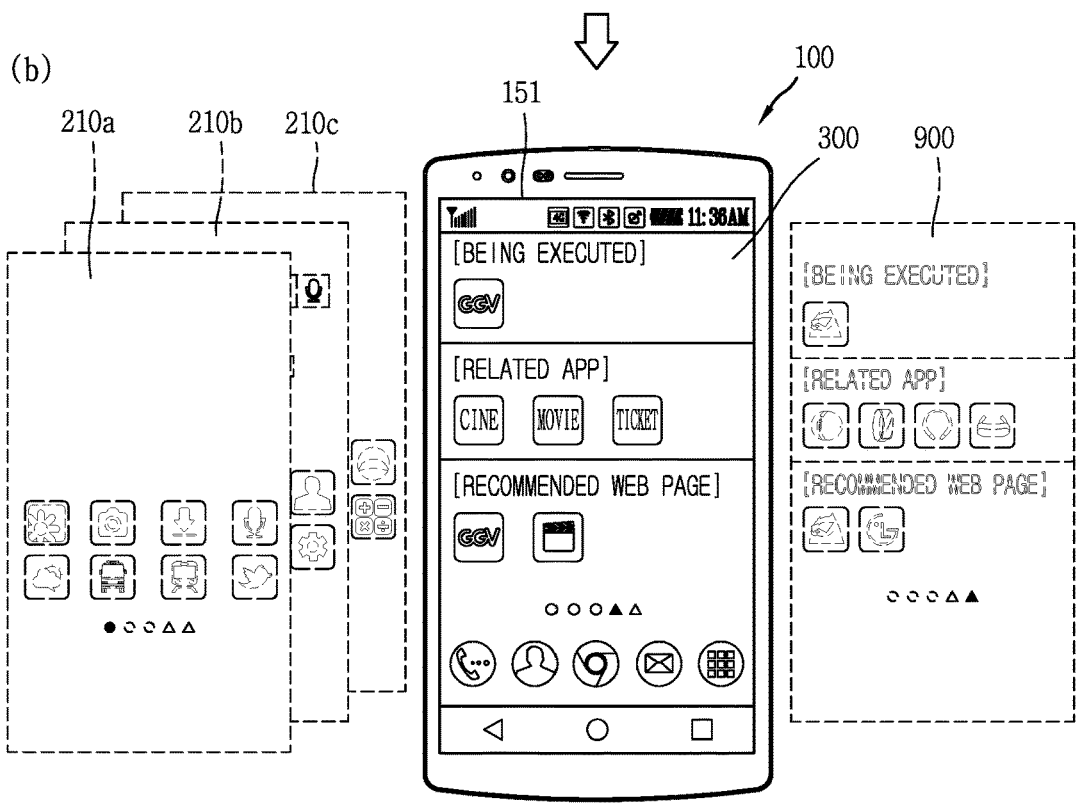
Figure 9C:
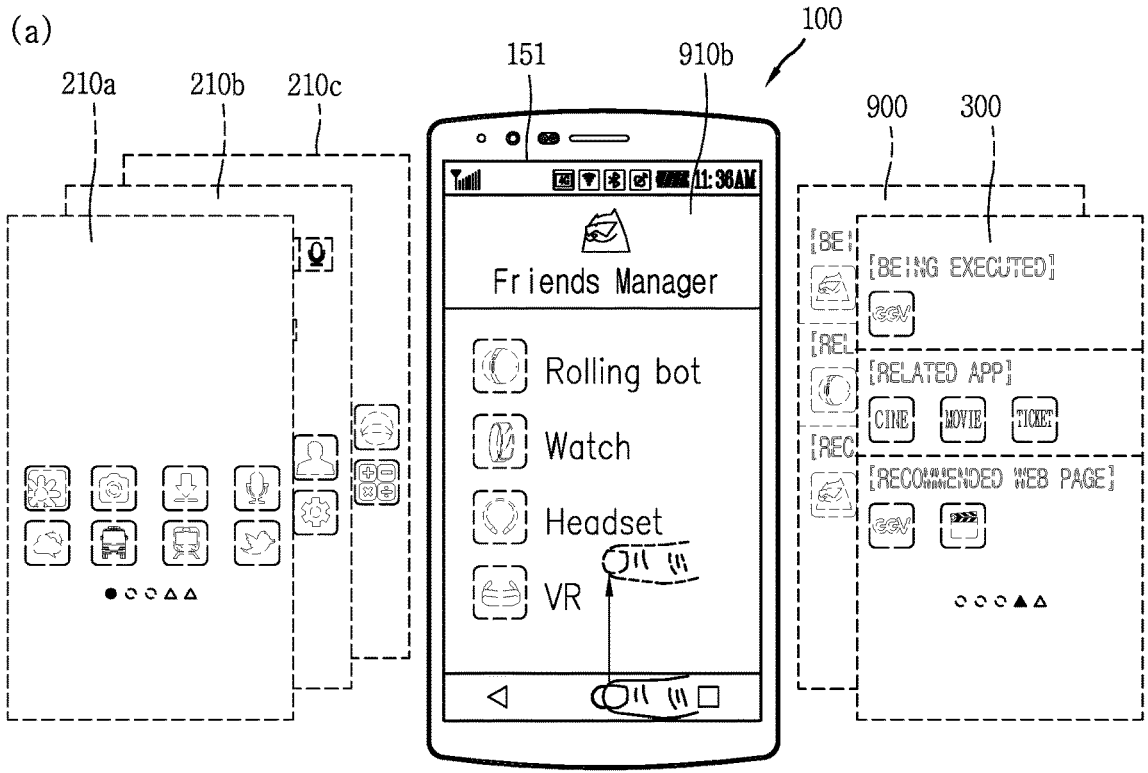
Figure 9C:
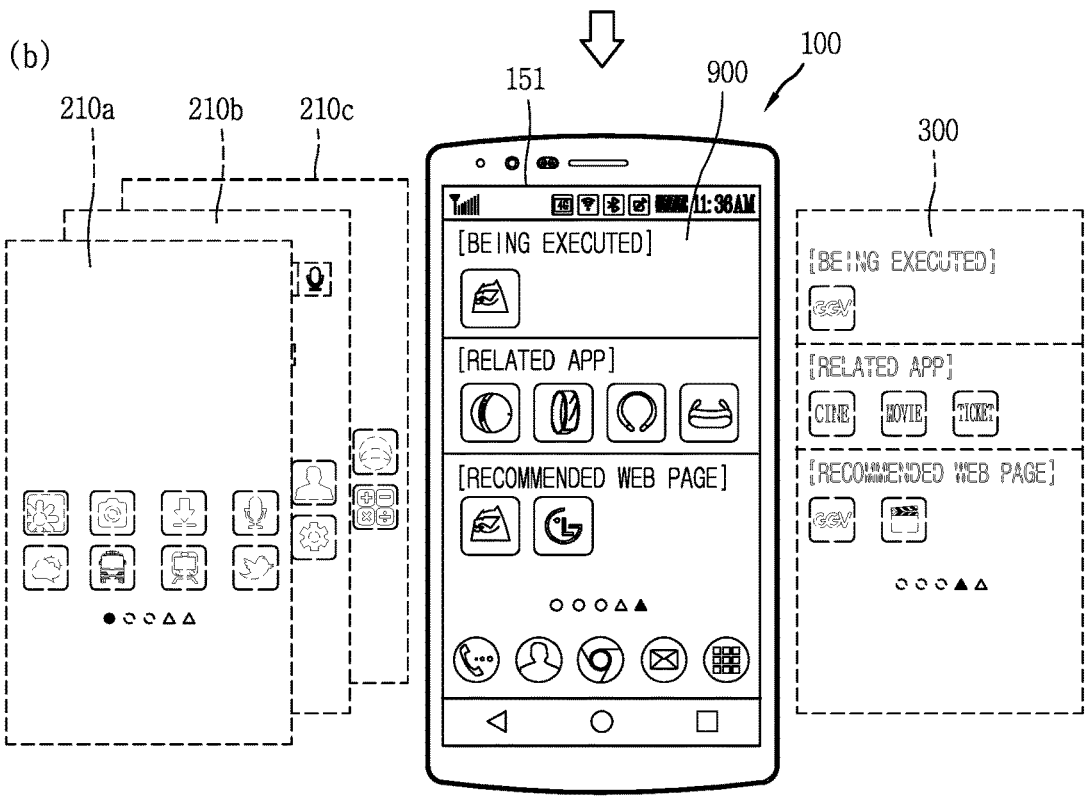

Hereinafter, a method of setting a plurality of temporary home screen pages will be described. FIGS. 9A to 9C are conceptual views illustrating a control method when a plurality of temporary home screen pages is set.

The controller 180 may generate a plurality of temporary home screen pages associated with a plurality of applications, respectively, when the plurality of applications is being simultaneously executed. That is, the controller 180 may generate a first temporary home screen page associated with a first application, and a second temporary home screen page associated with a second application when the first and second applications are being simultaneously executed.

For example, as illustrated in (a) of FIG. 9A, the mobile terminal may have three home screen pages 210*a* to 210*c* and one temporary home screen page 300 set thereon. Here, one temporary home screen page 300 is a home screen page associated with the first application.

In this state, the controller 180 may execute the second application corresponding to a specific icon 910*a* in response to a touch input applied to the specific icon 910*a*. In this case, an execution screen 910*b* of the second application may be displayed on the display unit 151 as illustrated in (b) of FIG. 9A.

The controller 180 may generate a temporary home screen page 900 related to the second application, in response to a touch input of a preset type being applied, in a state where the execution screen 910*b* of the second application is being displayed.

That is, as illustrated in (c) of FIG. 9A, the controller 180 may generate temporary home screen pages 300 and 900 for the first and second applications, respectively. Hereinafter, for convenience of explanation, such home screen pages will be described as a first temporary home screen page 300 associated with the first application and a second temporary home screen page 900 associated with the second application.

The controller 180 may display any one of the first and second temporary home screen pages 300 and 900 on the display unit 151 based on screen information displayed on the display unit 151.

For example, as illustrated in (a) of FIG. 9B, an execution screen 410*b* of the first application may be displayed on the display unit 151. In this case, the controller 180 may analyze screen information displayed on the display unit 151 when a touch input of a preset type is applied.

The controller 180 may then output the first temporary home screen page 300 to the display unit 151 in the case of the execution screen 410*b* of the first application.

Likewise, as illustrated in (a) of FIG. 9C, an execution screen 910*b* of the second application may be displayed on the display unit 151. In this case, the controller 180 may analyze screen information displayed on the display unit 151 when a touch input of a preset type is applied.

The controller 180 may then output the second temporary home screen page 900 to the display unit 151 in the case of the execution screen 910*b* of the second application.

The foregoing description has been given of an embodiment in which a plurality of temporary home screen pages is generated.

Figure 10A:
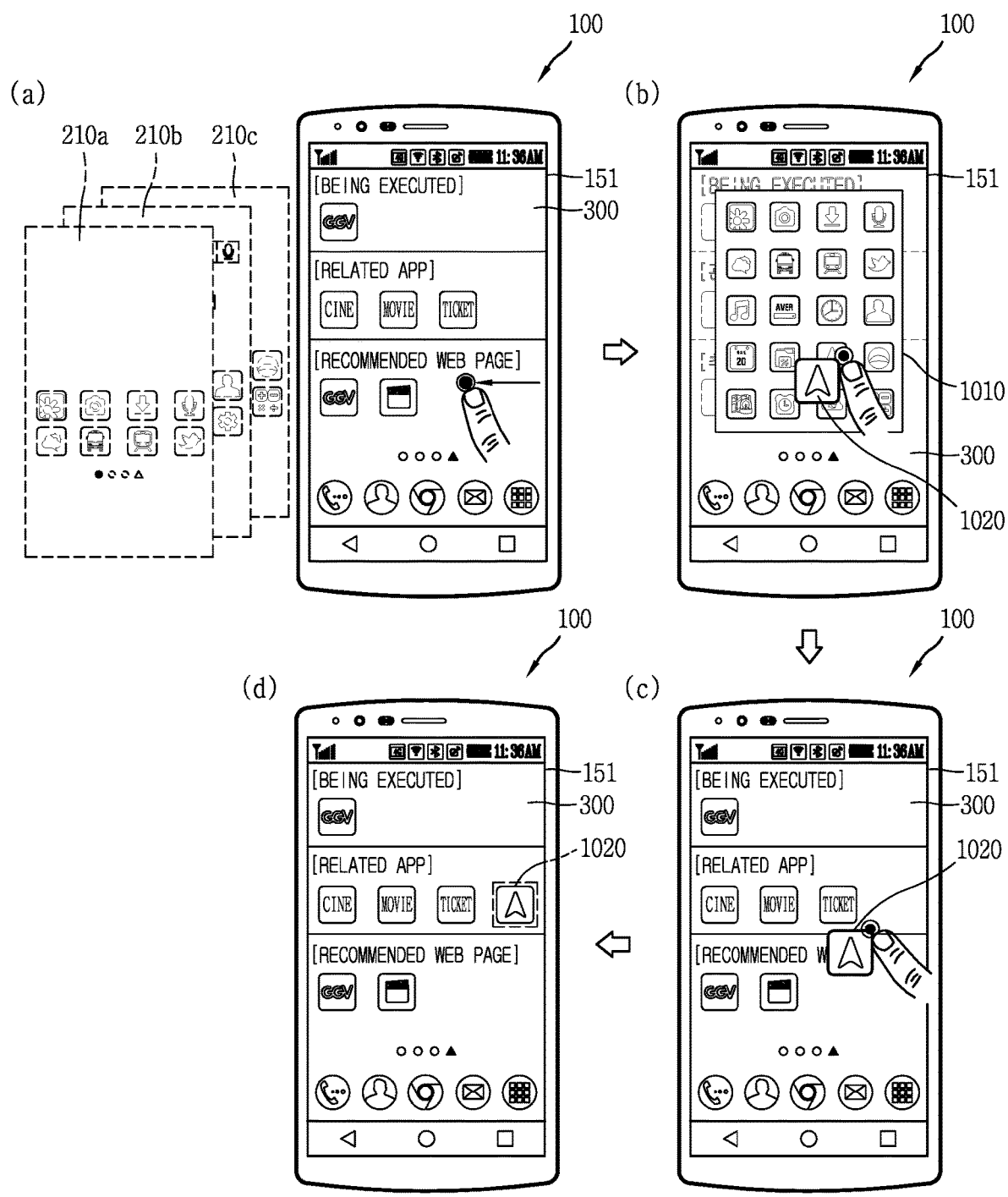
FIGS. 10A and 10B are conceptual views illustrating embodiments related to addition and deletion of an icon on a home screen page.
Figure 10B:
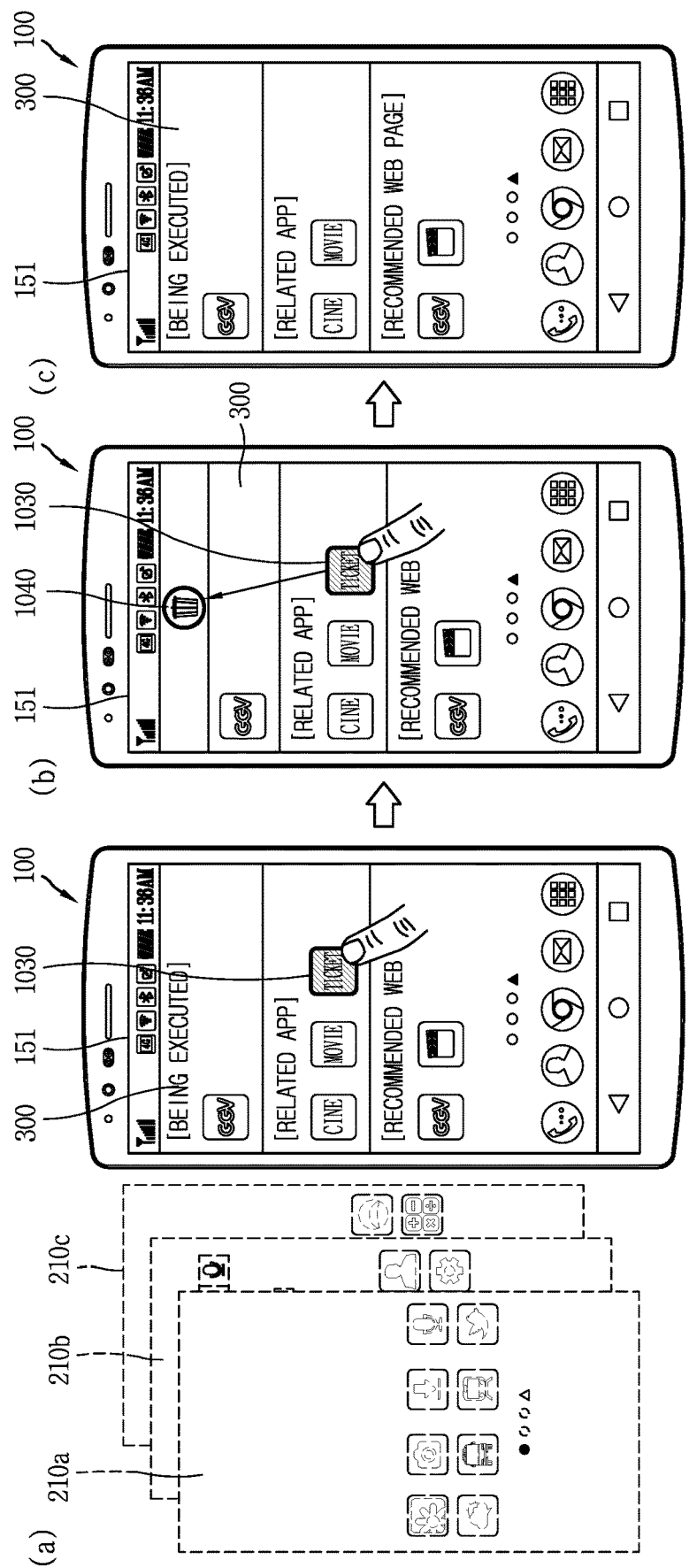

Hereinafter, an embodiment related to addition and deletion of an icon on a temporary home screen page will be described. FIGS. 10A and 10B are conceptual views illustrating embodiments related to addition and deletion of an icon on a home screen page.

The controller 180 may add or delete an icon on a temporary home screen page based on a user's control command. Here, adding an icon to a temporary home screen page is an operation of the mobile terminal that displays a new icon on the temporary home screen page, and deleting an icon on a temporary home screen page is an operation of the mobile terminal that a specific icon included in the temporary home screen page is controlled so as not to be displayed any more.

For example, as illustrated in (a) of FIG. 10A, the controller 180 may output an application list 1010, in response to a drag input being applied from right to left on the display unit 151 while the temporary home screen page 300 is displayed.

The application list 1010 is a list having icons of a plurality of applications as items. More specifically, the application list 1010 is a list in which icons of a plurality of applications are arranged so that a user can select or check the icons.

The applications included in the application list 1010 may be applications installed in the mobile terminal, applications whose installation files merely exist in the list, and the like.

As illustrated in (b) of FIG. 10, the user may select a specific icon 1020 among the icons of the plurality of applications included in the application list 1010.

In this case, the controller 180 may display the specific icon 1020 on the temporary home screen page 300, as illustrated in (c) and (d) of FIG. 10.

As another example, as illustrated in (a) and (b) of FIG. 10B, the controller 180 may output a graphic object 1040 for icon deletion, in response to a touch input being applied to a specific icon 1030 included in the temporary home screen page 300.

The controller 180 may move the specific icon 1030 to the graphic object 1040 for deleting the icon, in response to a touch input successive to the touch input applied to the specific icon 1030. The controller 180 may then delete the specific icon 1030, in response to a release of the touch input, in a state where the specific icon 1030 is displayed on the graphic object 1040 for deleting the icon. In this case, as illustrated in (c) of FIG. 10B, the specific icon may no longer be displayed on the temporary home screen page 300.

The foregoing description has been given of a method of adding or deleting an icon on a temporary home screen page.

Figure 11A:
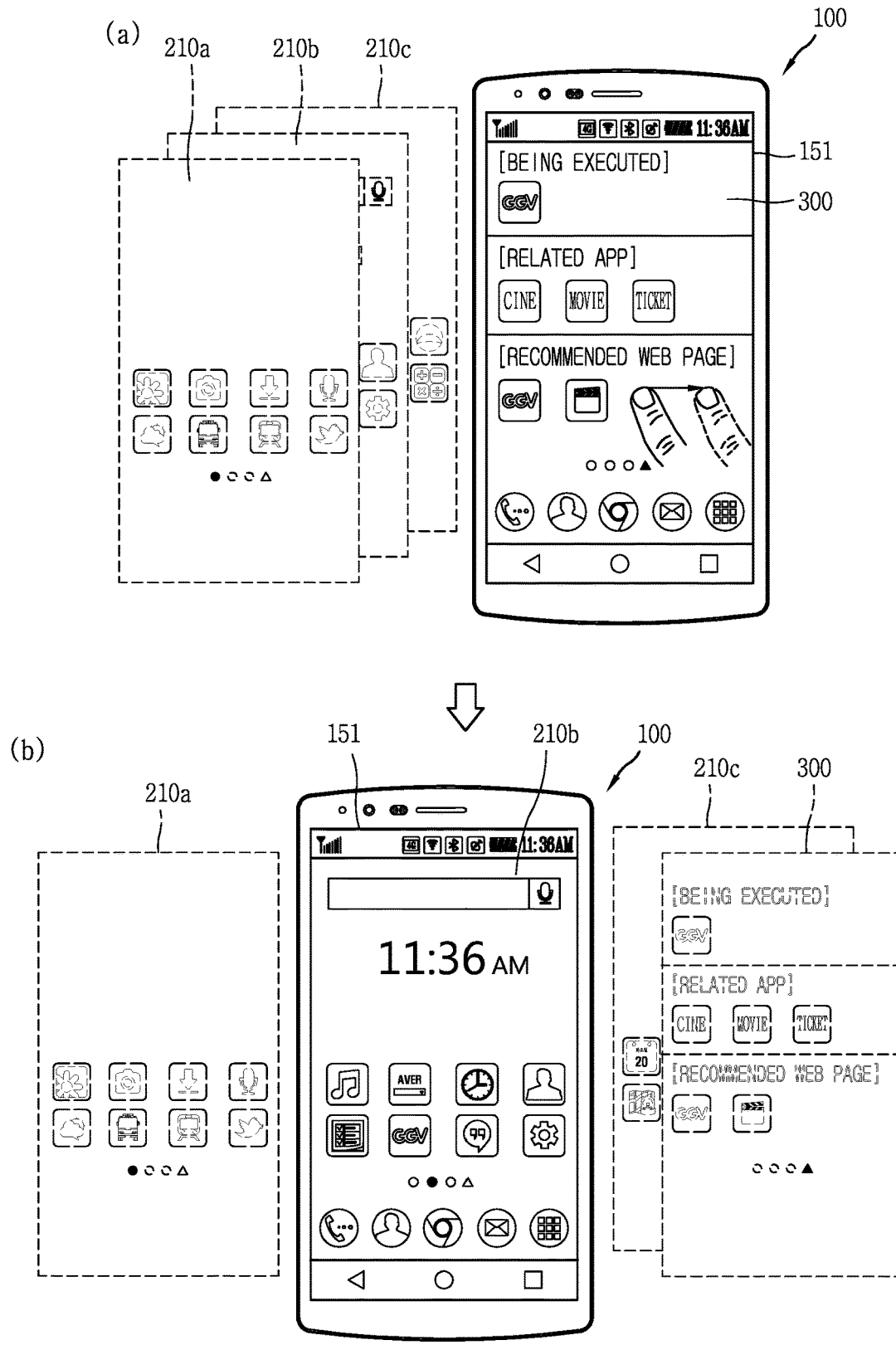
FIGS. 11A and 11B are conceptual views illustrating a method of escaping from a temporary home screen page.
Figure 11B:
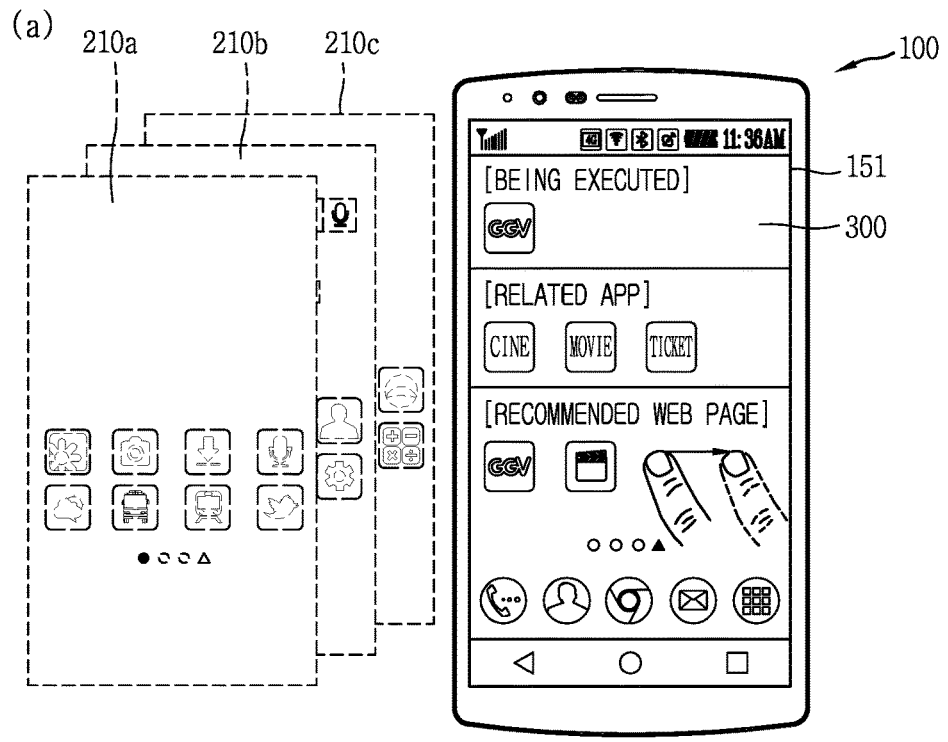
Figure 11B:
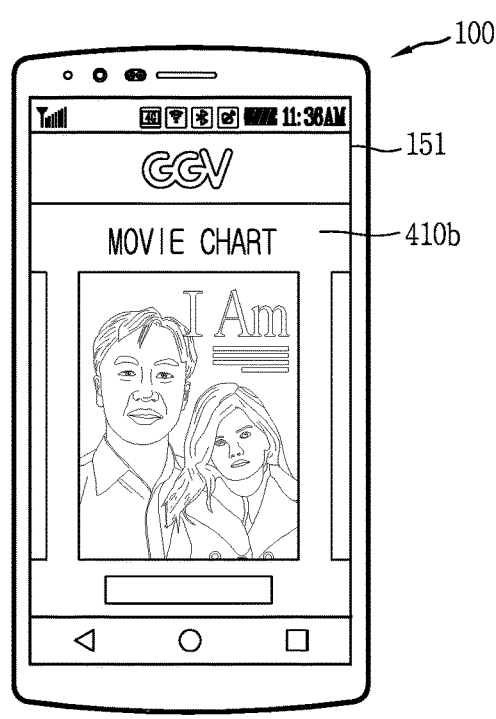

Hereinafter, a method of escaping from a temporary home screen page will be described. FIGS. 11A and 11B are conceptual views illustrating a method of escaping from a temporary home screen page.

The controller 180 may escape from the temporary home screen page 300 based on a user request while the temporary home screen page 300 is displayed. Here, the escape from the temporary home screen page is an operation opposite to the entry into the temporary home screen page, namely, an operation of the mobile terminal that switches a displayed state of the temporary home screen page to a non-displayed state of the temporary home screen page.

The controller 180 may display a general home screen page or an execution screen of an application associated with the temporary home screen page when escaping from the temporary home screen page, in response to a user's request for displaying the temporary home screen page 300 no longer.

For example, as illustrated in (a) of FIG. 11A, the controller 180 may detect that a flicking touch input from the left to the right is applied while the temporary home screen page 300 is displayed. In this case, as illustrated in (b) of FIG. 11A, the controller 180 may redisplay the second home screen page 210b, which was displayed on the display unit 151 before the temporary home screen page is displayed.

As another example, as illustrated in (a) of FIG. 11B, the controller 180 may detect that a flicking touch input from the left to the right is applied while the temporary home screen page 300 is displayed. In this case, the controller 180 may output an execution screen 410b of an application associated with the temporary home screen page 300.

Whether to display the second home screen page or the execution screen of the application may be preset in the mobile terminal at the shipment of the mobile terminal or set by a user selection.

The foregoing description has been given of an escape operation from a temporary home screen page.

Figure 12A:
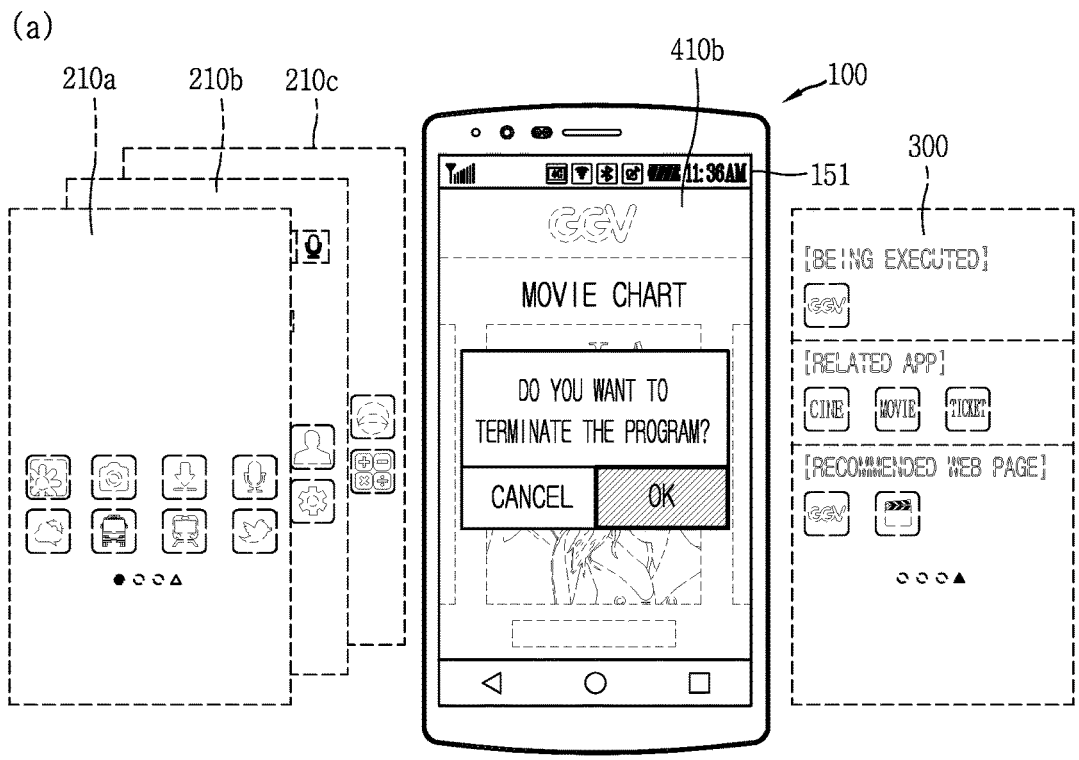
FIGS. 12A and 12B are conceptual views illustrating an embodiment in which a temporary home screen page is deleted.
Figure 12A:
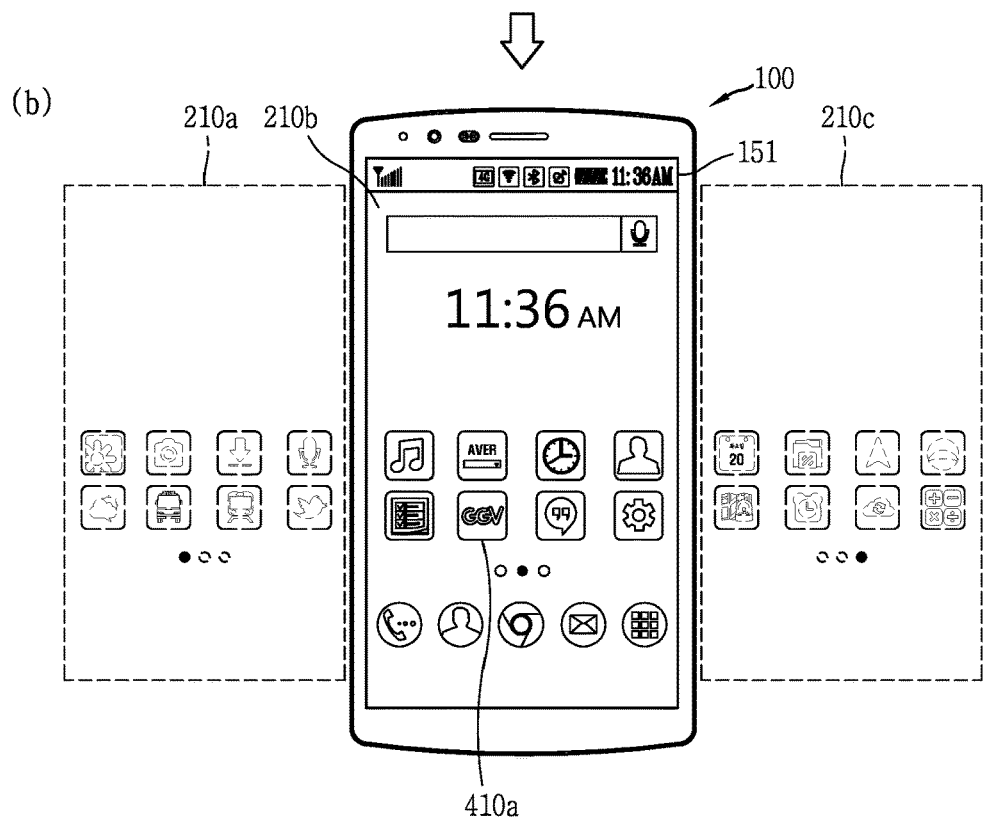
Figure 12B:
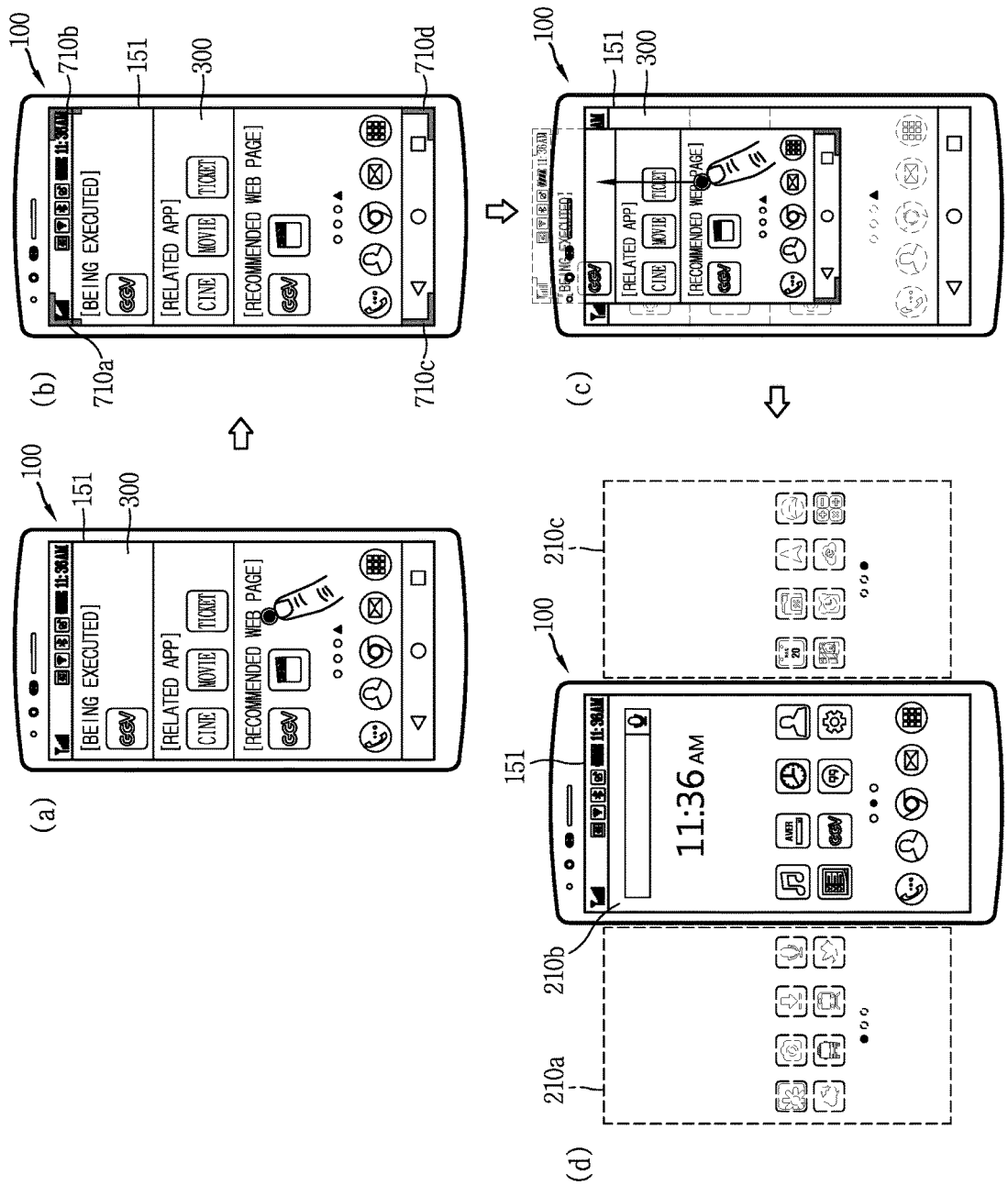

Hereinafter, an embodiment of deleting a temporary home screen page is deleted will be described. FIGS. 12A and 12B are conceptual views illustrating an embodiment in which a temporary home screen page is deleted.

The controller 180 may generate a temporary home screen page associated with a specific application, in response to an execution of the specific application or a touch input of a preset type being applied while the specific application is executed.

Also, the controller 180 may delete the temporary home screen page based on a termination of the specific application or a user request. The deletion of the temporary home screen page is an operation of the mobile terminal of controlling the temporary home screen page to be no longer output as a home screen page.

At this time, when the temporary home screen page is terminated, the controller 180 may output a specific home screen page among a plurality of home screen pages. Here, the specific home screen page may be a home screen page set as a home page, or a home screen page including an icon of a specific application associated with the temporary home screen page.

For example, as illustrated in (a) of FIG. 12A, the controller 180 may detect that an execution of the application related to the temporary home screen page 300 is terminated. In this case, as illustrated in (b) of FIG. 12A, the controller 180 may delete the temporary home screen page. Then, the controller 180 may display the second home screen page 210b including the icon 410a of the application on the display unit 151.

As another example, as illustrated in (a) of FIG. 12B, the controller 180 may execute an editing mode of the temporary home screen page 300 based on a user request. Afterwards, as illustrated in (b) and (c) of FIG. 12B, the controller 180 may move the temporary home screen page 300 to an upper end of the display unit 151. As illustrated in (d) of FIG. 12B, the controller 180 may delete the temporary home screen page 300, in response to a touch input for the movement being released after the temporary home screen page 300 is moved by a predetermined distance or more.

Accordingly, the present invention can reduce complexity of the display unit due to indiscriminate generation of temporary home screen pages.

According to a mobile terminal of the present invention as described above, information related to a currently executed application can be provided more intuitively by providing a temporary home screen page including recommended applications related to the currently executed application.

In addition, according to the present invention, a search time for applications associated with a currently executed application can be shortened by collectively providing recommended applications through a temporary home screen page.

Also, according to the present invention, a temporary home screen page can be deleted along with a termination of an application. This may result in preventing an increase in visual complexity of a display unit due to generation of the temporary home screen page.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal, comprising:
a display unit to display a specific home screen page among a plurality of home screen pages, wherein the specific home screen page is displayed when the mobile terminal is in an idle state and in full screen; and
a controller to execute an application corresponding to a specific icon included in the specific home screen page, in response to a touch input being applied to the specific icon,
wherein the controller generates a temporary home screen page associated with the application, in response to a touch input of a preset type applied during the execution of the application,
wherein the temporary home screen page includes applications associated with the currently executed application,
wherein the controller generates the temporary home screen page based on an occurrence of an event related to the specific icon without a user input and displays the temporary home screen page in full screen on the display unit instead of the specific home screen page,
wherein the event is an event of receiving information related to the application related to the specific icon from at least one of an external server and an external terminal,
wherein the controller is further configured to:
escape from the temporary home screen page in response to a predetermined touch input,
display a first screen instead of the temporary home screen page on the display unit based on a first user selection when the predetermined touch input is applied to the temporary home screen page in a first direction, and
display a second screen different from the first screen instead of the temporary home screen page on the display unit based on a second user selection when the predetermined touch input is applied to the temporary home screen page, and
wherein the controller deletes the temporary home screen page when a predetermined condition is satisfied and displays the specific home screen page in full screen instead of the temporary home screen page.

2. The terminal of claim 1, wherein the temporary home screen page includes an icon of at least one of a recommended application recommended to be executed together with the currently executed application, an Internet connection address (uniform resource locator; URL) providing a function related to the currently executed application, and an application executable without installation in the mobile terminal.

3. The terminal of claim 1, wherein the event related to the specific icon is a message reception event when the application corresponding to the specific icon is a message application.

4. The terminal of claim 1, wherein the temporary home screen page includes icons of a plurality of applications, and
wherein the controller outputs at least one of the plurality of applications included in the temporary home screen page on the specific home screen page in the same arrangement manner as an output arrangement of the at least one application on the temporary home screen page when the at least one application is output to the specific home screen page.

5. The terminal of claim 1, wherein the predetermined condition being satisfied corresponds to when the currently executed application is terminated.

6. The terminal of claim 1, wherein the controller deletes the temporary home screen page based on a user request after the temporary home screen page is generated.

7. The terminal of claim 1, wherein the controller, when a plurality of applications is being simultaneously executed, generates different temporary home screen pages respectively corresponding to the plurality of applications being executed, and
wherein the different temporary home screen pages include applications associated with applications corresponding to the different temporary home screen pages, respectively.

8. The terminal of claim 7, wherein the controller enters one of the different temporary home screen pages based on screen information displayed on the display unit.

9. The terminal of claim 8, wherein the controller outputs the temporary home screen page related to the screen information displayed on the display unit based on the screen information at a time point when a user input requesting for the output of the temporary home screen page is applied.

10. The terminal of claim 1, wherein the controller adds an icon of a specific application on the temporary home screen page based on a user request.

11. The terminal of claim 10, wherein the controller outputs an application list including icons of applications, in response to a preset type of touch being applied to the temporary home screen page, and adds an icon of at least one application among the icons of the applications included in the application list, on the temporary home screen page, based on a user request.

12. The terminal of claim 1, wherein the temporary home screen page includes a plurality of applications divided into at least two groups based on preset criterion, and
wherein the temporary home screen page displays the plurality of applications for the divided at least two groups.

13. The terminal of claim 1, wherein the controller, when there is a specific application without being installed in the mobile terminal among the applications included in the temporary home screen page, installs the specific application on the mobile terminal based on a user request.

14. The terminal of claim 13, wherein the controller installs the specific application on the mobile terminal, in response to a user input for moving the specific application from the temporary home screen page to the specific home screen page, and controls the specific home screen page so that the specific application is displayed on the specific home screen page.

15. The terminal of claim 1, wherein the controller displays an execution screen of the application on the display unit, in response to a detection of a drag input applied in a specific direction, in a state where the temporary home screen page is displayed on the display unit.

16. A method for controlling a mobile terminal, the method comprising:
  displaying a specific home screen page of a plurality of home screen pages on a display unit, wherein the specific home screen page is displayed when the mobile terminal is in an idle state and in full screen;
  executing an application corresponding to a specific icon included in the specific home screen page, in response to a touch input being applied to the specific icon; and
  generating a temporary home screen page associated with the application, in response to a touch input of a preset type being applied during the execution of the application,
  wherein the temporary home screen page includes applications associated with the currently executed application,
  wherein the temporary home screen page is generated based on an occurrence of an event related to the specific icon without a user input and displays the temporary home screen page in full screen on the display unit instead of the specific home screen page,
  wherein the event is an event of receiving information related to the application related to the specific icon from at least one of an external server and an external terminal,
  wherein the method further comprises:
    escaping from the temporary home screen page in response to a predetermined touch input
    displaying a first screen instead of the temporary home screen page on the display unit based on a first user selection when the predetermined touch input is applied to the temporary home screen page; and
    displaying a second screen different from the first screen instead of the temporary home screen page on the display unit based on a second user selection when the predetermined touch input is applied to the temporary home screen page, and
  wherein the method further comprises deleting the temporary home screen page when a predetermined condition is satisfied and displaying the specific home screen page in full screen instead of the temporary home screen page.

17. The method of claim 16, wherein the temporary home screen page includes an icon of at least one of a recommended application recommended to be executed together with the currently-executed application, an Internet connection address (uniform resource locator; URL) providing a function related to the currently-executed application, and an application executable without being installed in the mobile terminal.

* * * * *